(12) United States Patent
Lai et al.

(10) Patent No.: US 8,950,315 B2
(45) Date of Patent: Feb. 10, 2015

(54) BREWED BEVERAGE APPLIANCE AND METHOD

(75) Inventors: Kin Man Lai, Shatin (HK); Kam Fai Fung, Tuen Mun (HK); Barbara Lynn Schnabel, Chappaqua, NY (US)

(73) Assignee: Conair Corporation, Stamford, CT (US)

( * ) Notice: Subject to any disclaimer, the term of this patent is extended or adjusted under 35 U.S.C. 154(b) by 146 days.

(21) Appl. No.: 13/338,926

(22) Filed: Dec. 28, 2011

(65) Prior Publication Data

US 2012/0171332 A1 Jul. 5, 2012

Related U.S. Application Data

(63) Continuation-in-part of application No. 13/231,021, filed on Sep. 13, 2011, and a continuation-in-part of application No. 13/231,035, filed on Sep. 13, 2011, and a continuation-in-part of application No. 13/230,980, filed on Sep. 13, 2011, and a continuation-in-part of application No. 13/230,954, filed on Sep. 13, 2011.

(60) Provisional application No. 61/413,744, filed on Nov. 15, 2010.

(51) Int. Cl.
*A47J 31/42* (2006.01)
*B65D 85/804* (2006.01)

(52) U.S. Cl.
CPC ............. *A47J 31/42* (2013.01); *B65D 85/8043* (2013.01)
USPC .................................. 99/286; 99/279; 99/295

(58) Field of Classification Search
CPC .................. A47J 31/42; A47J 31/3623; A47J 31/3628–31/3642
USPC ............. 99/286, 287, 289 R, 290, 295, 302 R
See application file for complete search history.

(56) References Cited

U.S. PATENT DOCUMENTS

| 2,968,560 A | | 1/1961 | Goros |
| 4,196,658 A | * | 4/1980 | Takagi et al. ................... 99/286 |
| 4,389,925 A | | 6/1983 | Piana |
| 5,207,148 A | * | 5/1993 | Anderson et al. ............... 99/281 |
| 5,531,152 A | | 7/1996 | Gardosi |
| 5,615,601 A | | 4/1997 | Eugstar |
| 5,794,519 A | | 8/1998 | Fischer |

(Continued)

FOREIGN PATENT DOCUMENTS

| WO | 2007016977 A1 | 2/2007 |
| WO | 2007138016 A1 | 12/2007 |

(Continued)

*Primary Examiner* — Dana Ross
*Assistant Examiner* — Brandon Harvey
(74) *Attorney, Agent, or Firm* — McCormick Paulding & Huber LLP

(57) ABSTRACT

A beverage appliance includes a housing having a liquid reservoir and a receptacle in the housing dimensioned to receive a container containing at least one drink ingredient having particles of a first size. The receptacle is pivotable from a first position in which the receptacle is angled towards a front of the appliance and a second position in which the receptacle is aligned with a brew head and contacts the brew head. The beverage appliance further includes a mechanism for transforming the particles of the drink ingredient from the first size to a second size within the container, the second size being smaller than the first size.

17 Claims, 26 Drawing Sheets

(56) References Cited

U.S. PATENT DOCUMENTS

| | | | |
|---|---|---|---|
| 5,865,095 A * | 2/1999 | Mulle | 99/286 |
| 6,339,985 B1 * | 1/2002 | Whitney | 99/286 |
| 7,320,274 B2 * | 1/2008 | Castellani | 99/295 |
| 7,571,674 B2 * | 8/2009 | Wang | 99/302 P |
| 2003/0005826 A1 | 1/2003 | Sargent et al. | |
| 2006/0090653 A1 | 5/2006 | McDuffie et al. | |
| 2009/0114100 A1 * | 5/2009 | Spinelli | 99/289 R |
| 2011/0163131 A1 * | 7/2011 | Mih et al. | 222/410 |

FOREIGN PATENT DOCUMENTS

| | | |
|---|---|---|
| WO | WO 2007138016 A1 * | 12/2007 |
| WO | WO 2009113035 A2 * | 9/2009 |

* cited by examiner

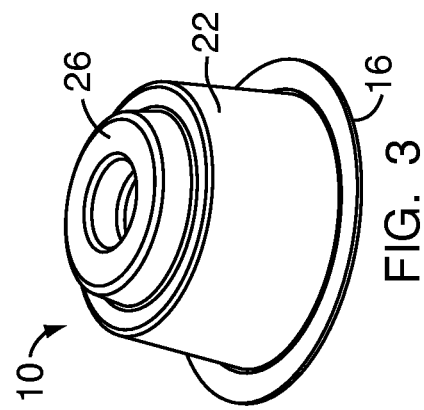
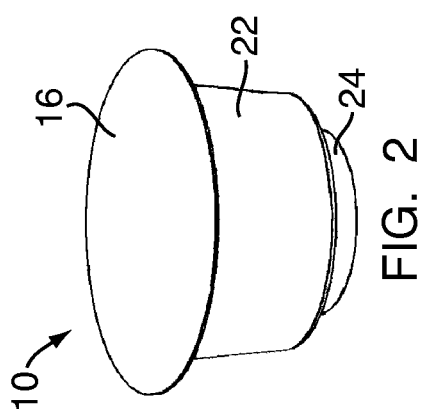
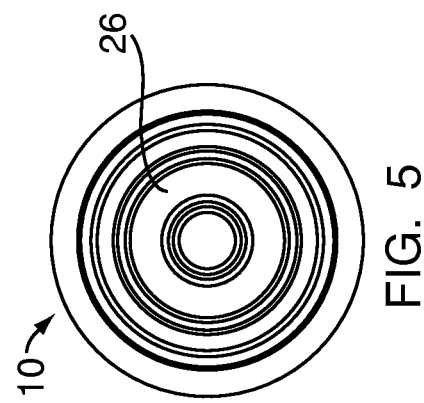
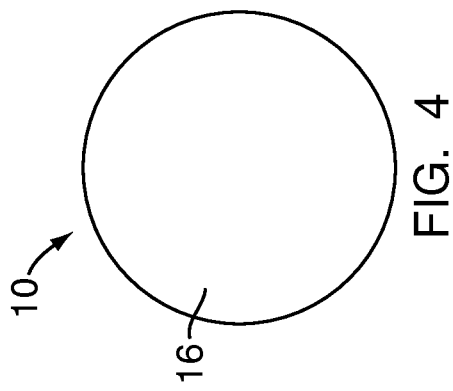
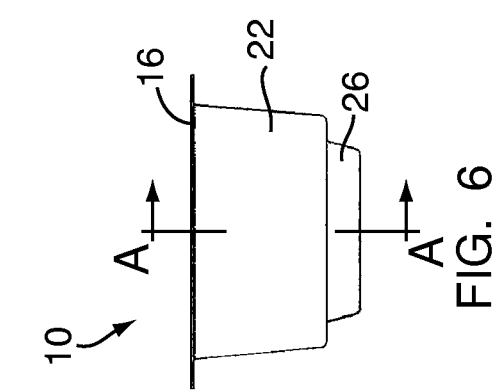

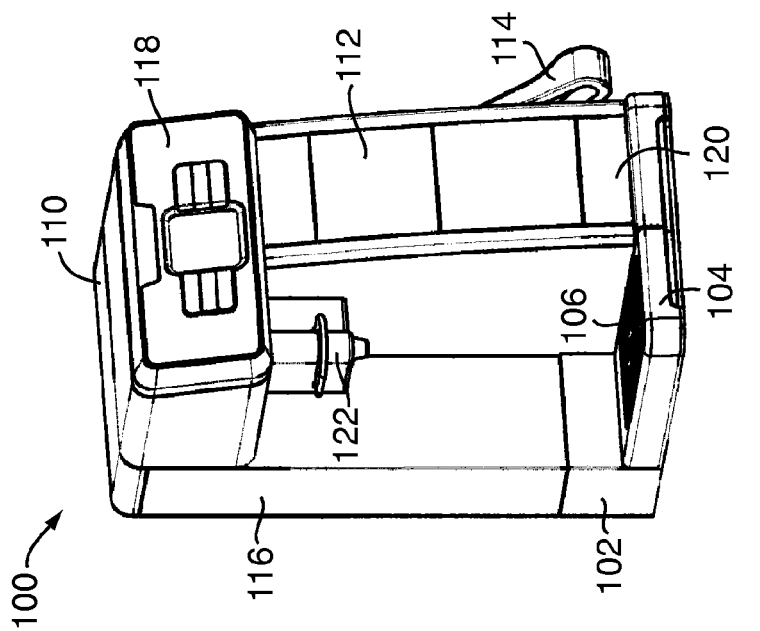
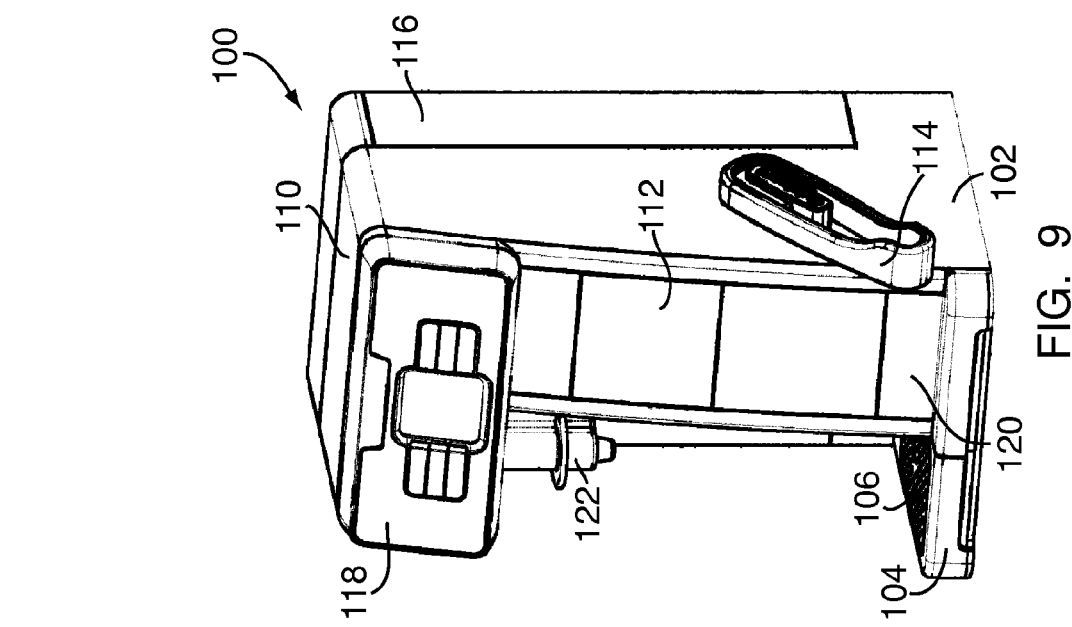

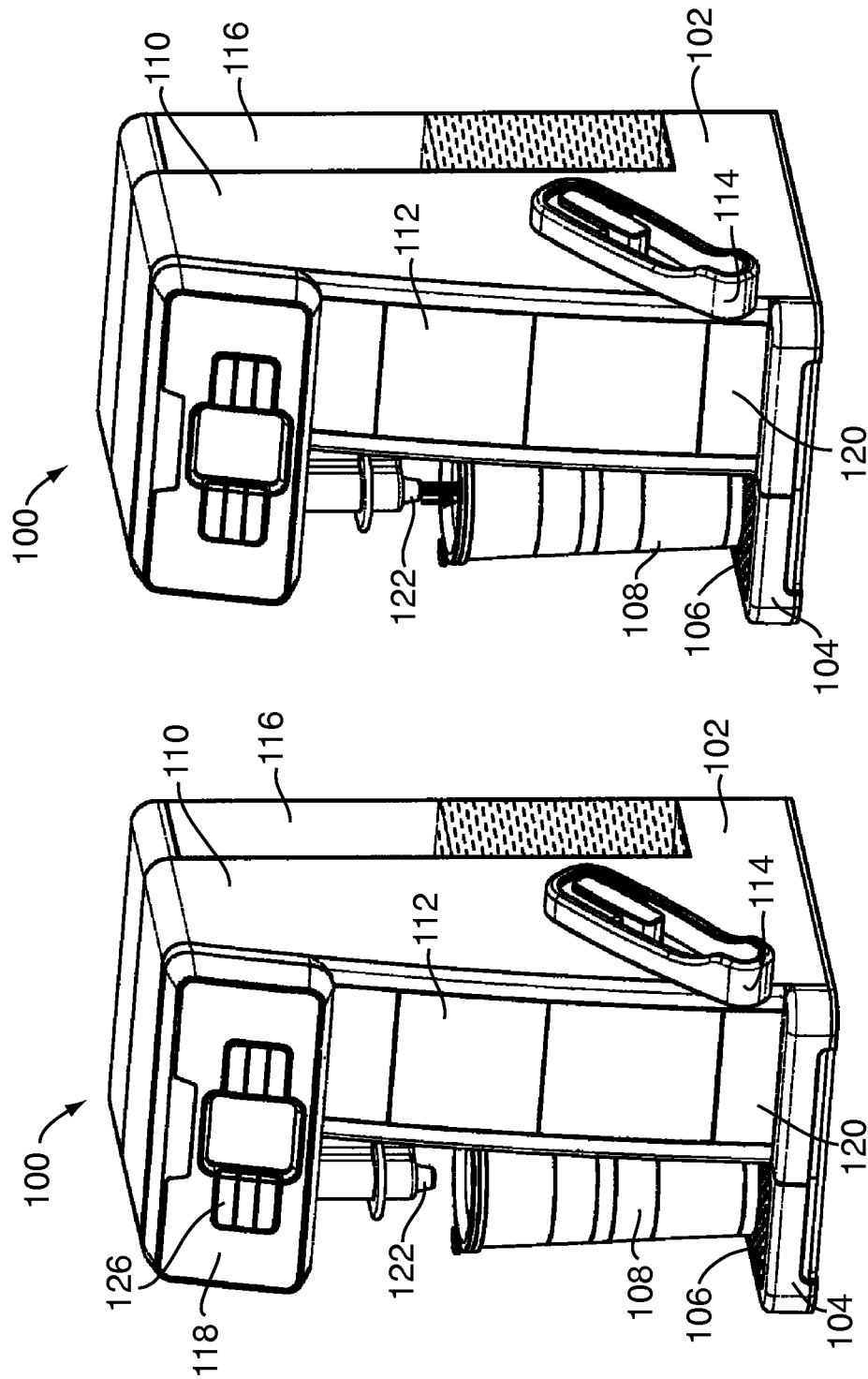

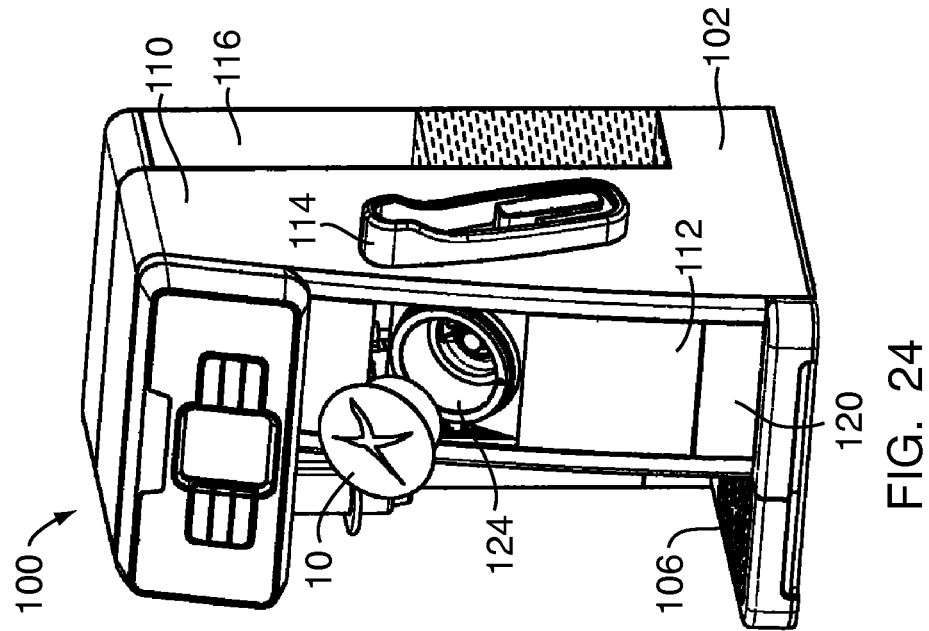
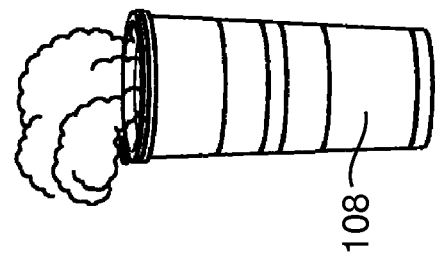
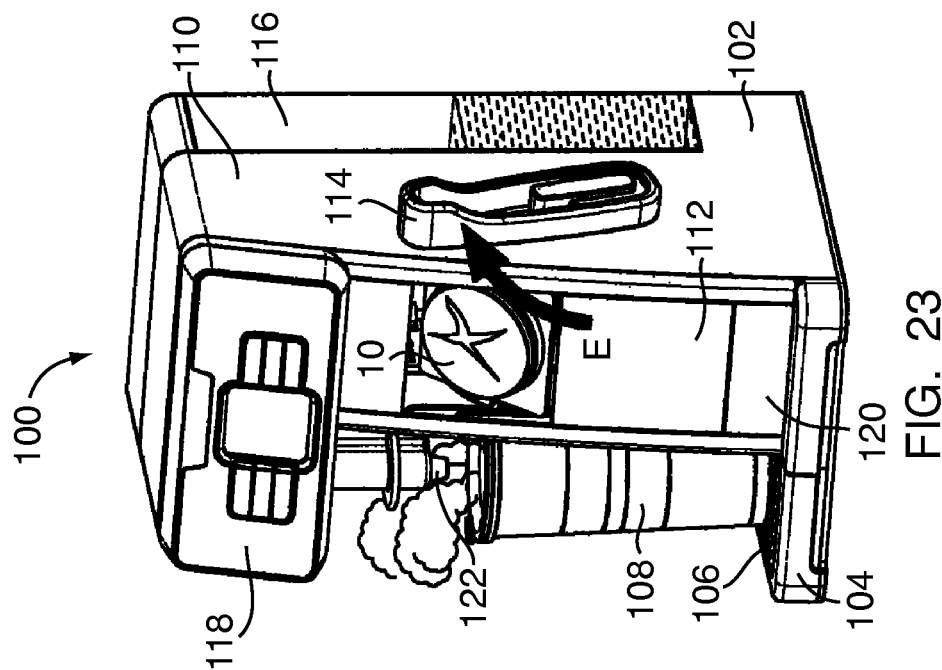

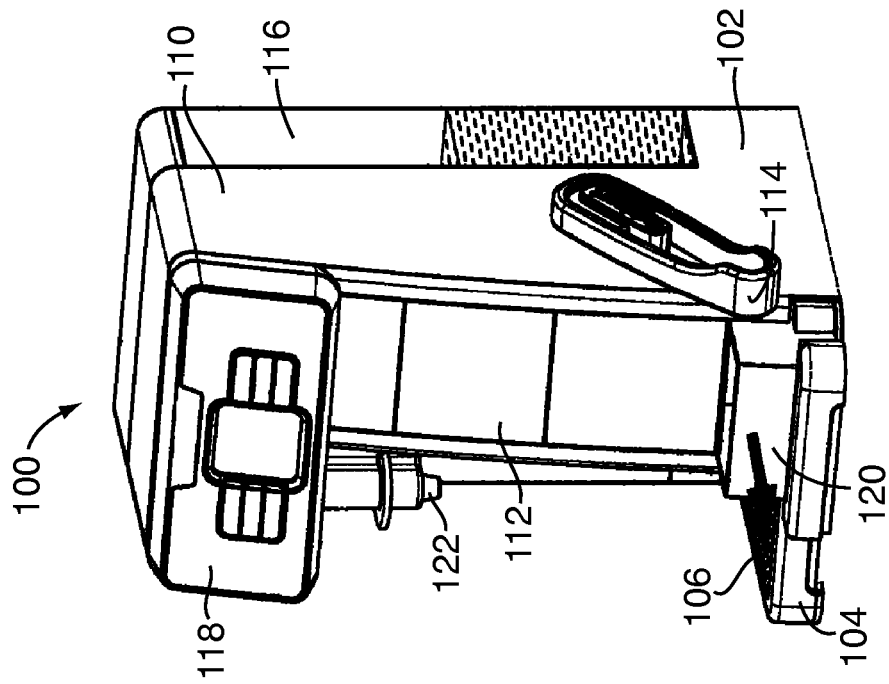
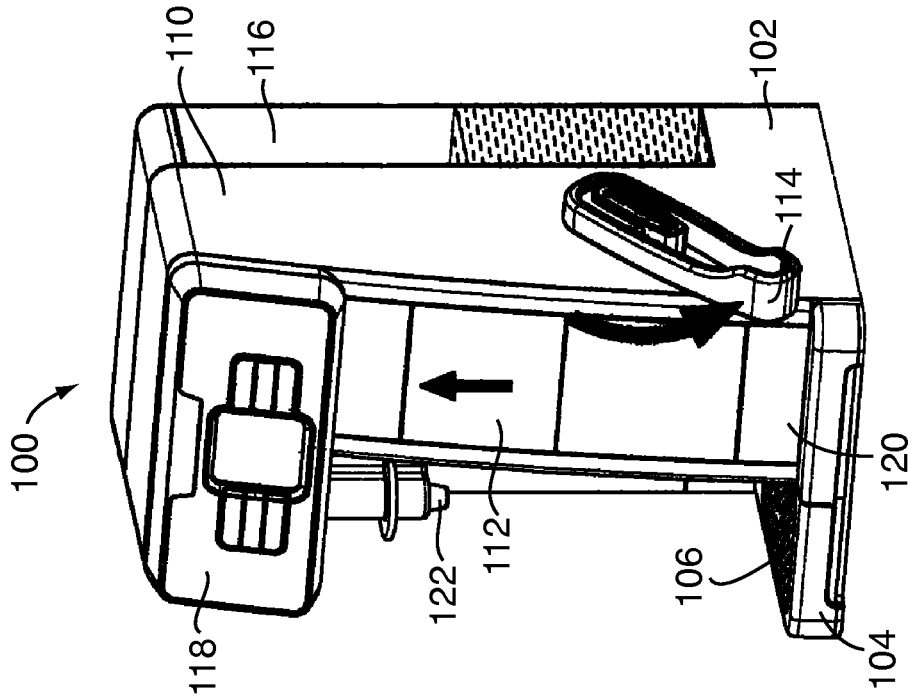

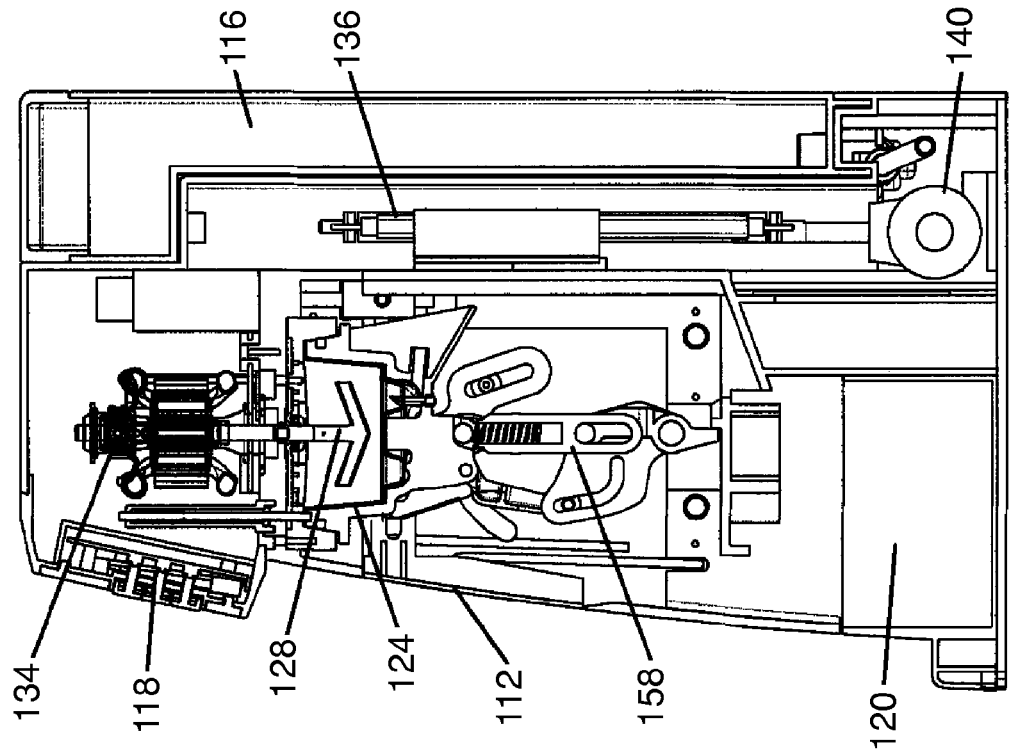
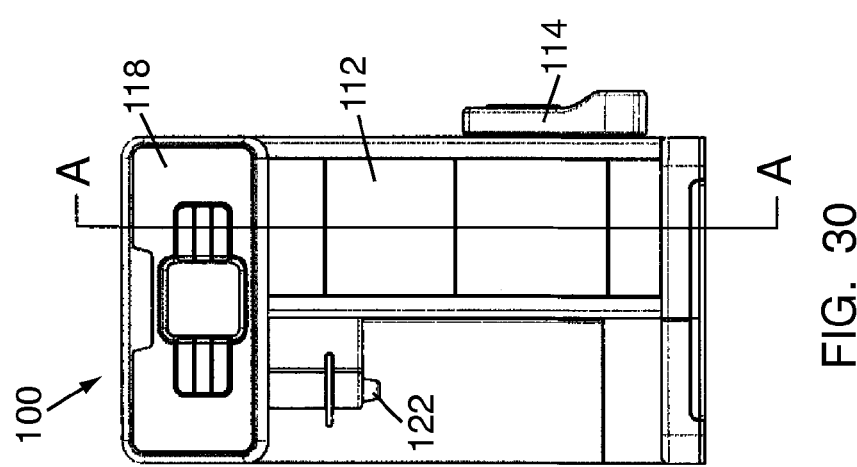
FIG. 31
FIG. 30

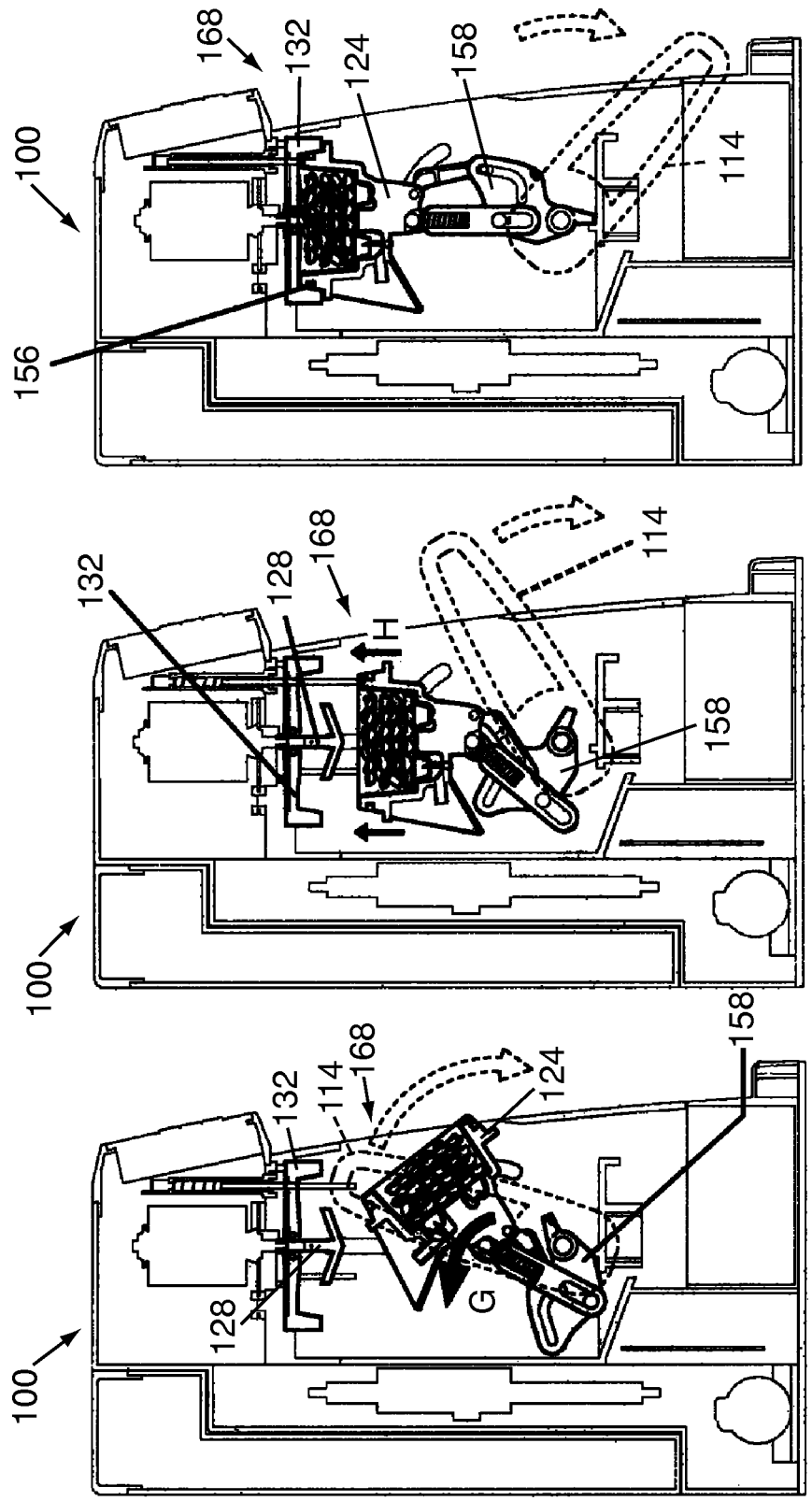

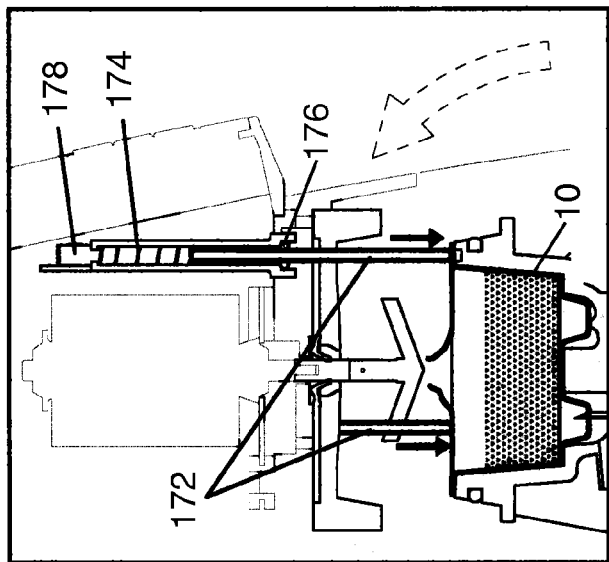
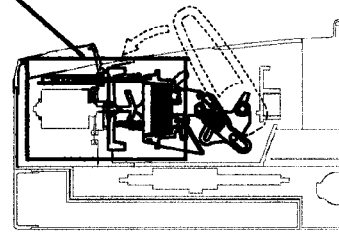
FIG. 40
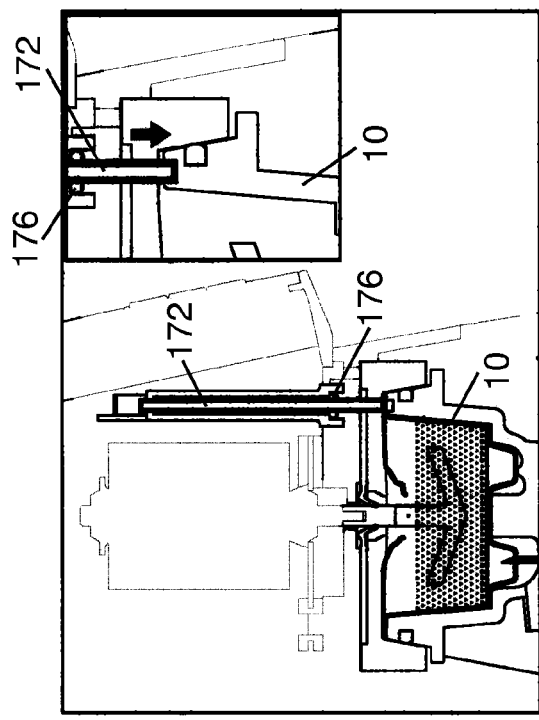
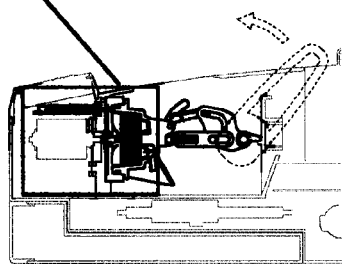
FIG. 39

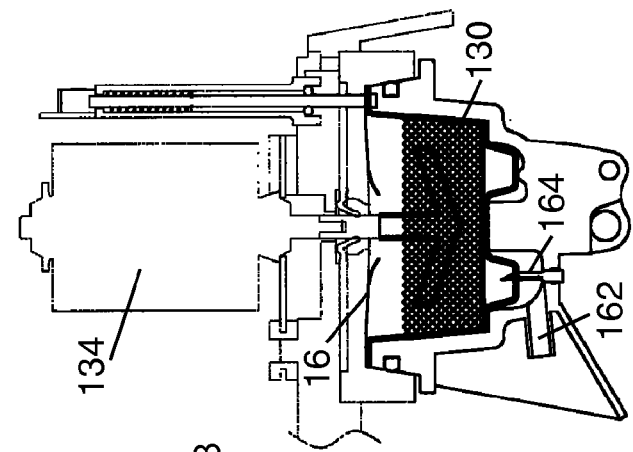
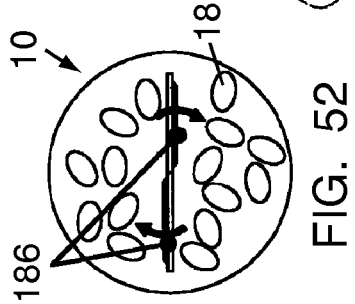
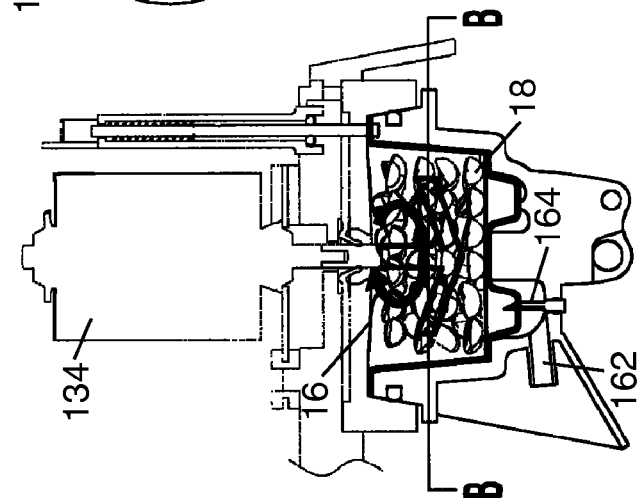
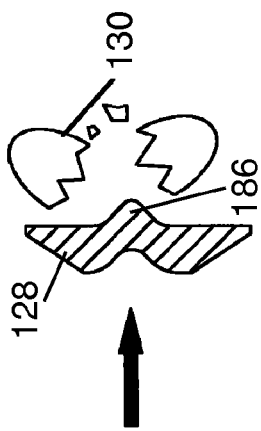
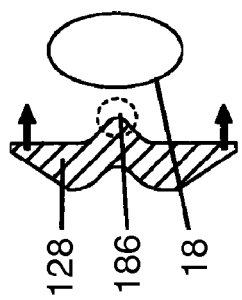
FIG. 51　FIG. 52　FIG. 53　FIG. 54

BREWED BEVERAGE APPLIANCE AND METHOD

CROSS-REFERENCE TO RELATED APPLICATIONS

This application is a continuation-in-part of, and claims the benefit of, U.S. patent application Ser. No. 13/231,021, filed on Sep. 13, 2011, U.S. patent application Ser. No. 13/231,035, filed on Sep. 13, 2011, U.S. patent application Ser. No. 13/230,980, filed on Sep. 13, 2011, and U.S. patent application Ser. No. 13/230,954, filed on Sep. 13, 2011, all of which claim the benefit of U.S. Provisional Application Ser. No. 61/413,744, filed on Nov. 15, 2010, all of the foregoing U.S. Patent Applications and Provisional Patent Applications being herein incorporated by reference in their entireties.

TECHNICAL FIELD

The present invention relates to brewed beverage appliances and, more particularly, to a brewed beverage appliance adapted to brew coffee from a pre-packaged, disposable container and filter combination.

BACKGROUND OF THE INVENTION

Various known coffee making appliances involve adding of coffee beans in one of various forms (i.e., ground or unground) to a container that is part of a machine in which heated water is delivered to the container and passes therethrough. The container typically includes a filtering mechanism so that heated water exiting the container is in the form of brewed coffee. Certain appliances require pre-ground coffee beans to be added in the form of "grounds." Other appliances are designed to accept whole coffee beans into a hopper or opening and include mechanisms that grind the beans into a ground form and then complete the brewing process at a separate station. It is sometimes preferred to keep whole beans on hand for making coffee so that the coffee may be ground immediately prior to brewing, as this is believed to produce the freshest tasting coffee beverage. Yet other appliances require use of pods or pre-packaged coffee grounds in a serving-sized filter container to be inserted into the appliance. In such instances, the pre-packaged pods or containers are limited to being filled with ground coffee. Certain pre-packaged containers require placement into a separate filter mechanism in the appliance, while others have built-in filtering mechanisms.

SUMMARY OF THE INVENTION

It is an object of the present invention to provide a beverage making appliance and related method that include the benefits of brewing coffee from whole beans that are ground immediately before brewing and that are contained in a convenient, disposable, single-serving package.

These and other objects are achieved by the present invention.

A beverage appliance includes a housing having a liquid reservoir and a receptacle in the housing dimensioned to receive a container containing at least one drink ingredient having particles of a first size. The receptacle is pivotable from a first position in which the receptacle is angled towards a front of the appliance and a second position in which the receptacle is aligned with a brew head and contacts the brew head. The beverage further includes a mechanism for transforming the particles of the drink ingredient from the first size to a second size within the container, the second size being smaller than the first size.

BRIEF DESCRIPTION OF THE DRAWINGS

FIG. 2 is a perspective top view of the whole coffee bean pre-packaged filter cup of FIG. 1.

FIG. 3 is a perspective bottom view of the whole coffee bean pre-packaged filter cup of FIG. 1.

FIG. 4 is a top plan view of the whole coffee bean pre-packaged filter cup of FIG. 1.

FIG. 5 is a bottom plan view of the whole coffee bean pre-packaged filter cup of FIG. 1.

FIG. 6 is a side elevational view of the whole coffee bean pre-packaged filter cup of FIG. 1.

FIG. 9 is a perspective right side view of a brewed beverage appliance according to the present invention.

FIG. 10 is a perspective left side view of the brewed beverage appliance of FIG. 9.

FIG. 21 is a perspective view of the brewed beverage appliance of FIG. 9 in a brew-ready state.

FIG. 22 is a perspective view of the brewed beverage appliance of FIG. 9 in a brewing mode.

FIG. 23 is a perspective view of the brewed beverage appliance of FIG. 9 subsequent to brewing a beverage.

FIG. 24 is a perspective view of the brewed beverage appliance of FIG. 9 illustrating the removal of a spent pre-packaged filter cup subsequent to brewing.

FIG. 25A is a perspective view of the brewed beverage appliance of FIG. 9 in a cleaning mode.

FIG. 25B is a perspective view of the brewed beverage appliance of FIG. 9 in a cleaning mode and illustrates the removal of a drip tray.

FIG. 30 is a front elevational view of the brewed beverage appliance.

FIG. 31 is a cross-sectional view of the brewed beverage appliance, taken along line A-A of FIG. 30.

FIGS. 34-36 are cross-sectional, schematic views of the brewed beverage appliance of FIG. 9 illustrating the loading and positioning of a filter cup.

FIG. 39 is an enlarged, cross-sectional view of the brewed beverage appliance, illustrating operation of the container unloading mechanism.

FIG. 40 is another enlarged, cross-sectional view of the brewed beverage appliance, illustrating operation of the container unloading mechanism.

FIG. 51 is an enlarged schematic view of a portion of the brewed beverage appliance of FIG. 1 in a grinding mode.

FIG. 52 is a cross-sectional view of a portion of the brewed beverage appliance of FIG. 1 in a grinding mode, taken along line B-B of FIG. 52.

FIG. 53 is an enlarged schematic view of a portion of the brewed beverage appliance of FIG. 1 subsequent to grinding coffee beans.

FIG. 54 is an enlarged schematic view of the grinding blade of the brewed beverage appliance of FIG. 1 illustrating the grinding a coffee bean.

DETAILED DESCRIPTION OF THE PREFERRED EMBODIMENTS

Figure 1:
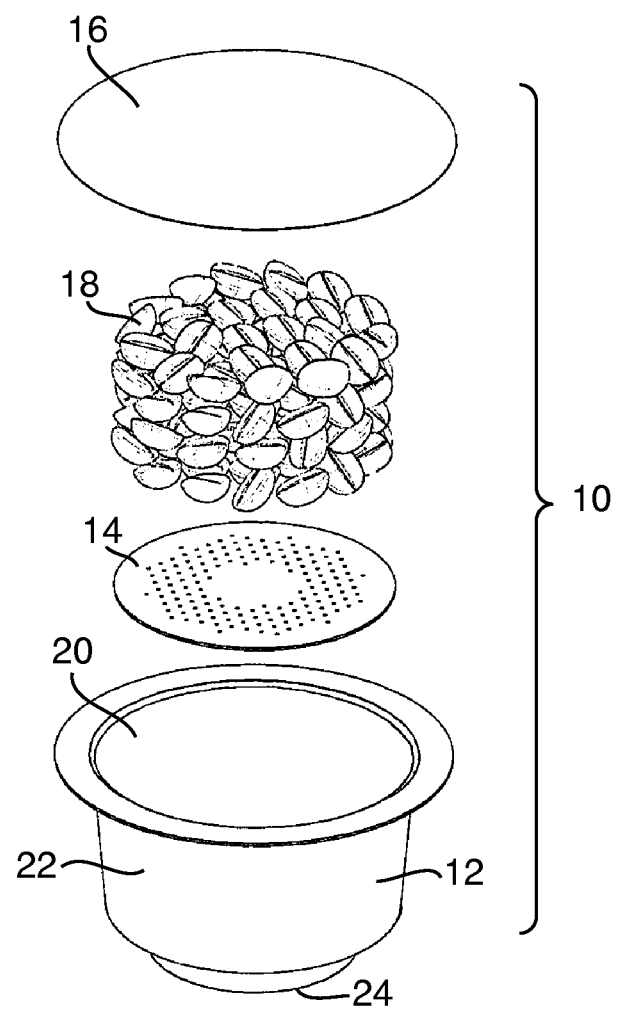
FIG. 1 is an exploded view of a whole coffee bean pre-packaged filter cup according to the present invention.

Referring to FIGS. 1-8, a filter cup 10 for use with a brewed beverage appliance according to the present invention includes a cup body 12, a resilient filter 14 and a cover 16. The cup body may be formed from plastic or other material known in the art, and is capable of being pierced by a piercing mechanism of a brewed beverage appliance. The filter 14 prevents coffee grounds and other sediment from exiting the cup body 12 during brewing but permits passage of liquid therethrough. Importantly, the filter 14 is resilient such that it is not damaged or destroyed during grinding, as discussed in detail hereinafter. The cover 16 may be formed from aluminum or other material known in the art, and is preferably heat-sealed or otherwise affixed to the top rim of the cup body 12. A plurality of whole coffee beans 18 are enclosed in the space between the cover 16 and the filter 14. While FIG. 1 shows coffee beans 18 housed in the filter cup 10, other types of food and substances, such as tea and the like, may be used in similar fashion to that described herein, without departing from the broader aspects of the present invention.

As further shown in FIG. 1, the cup body 12 has an opening 20 at the top thereof, a circumferential sidewall 22 and a floor 24. As best shown in FIGS. 3 and 6, the floor 24 has an annular groove 26 for the channeling of a brewed beverage to an exit aperture of the cup (created by a piercing mechanism of a brewed beverage appliance). Importantly, the annular groove 26 is the lowest portion of the cup 10 such that brewed coffee collects in the groove 26 and exits the cup through the exit aperture, as discussed hereinafter.

Figure 7:
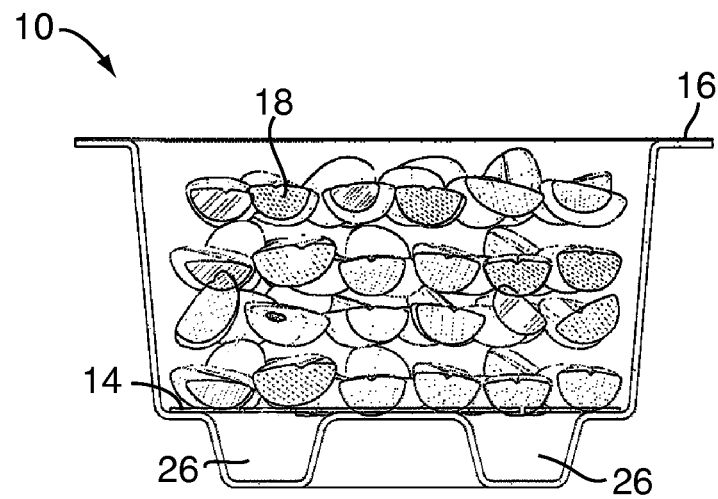
FIG. 7 is a side cross-sectional view of the whole coffee bean pre-packaged filter cup of FIG. 1 taken along line A-A of FIG. 6.

FIG. 7 illustrates the cup 10 in a sealed state and containing a plurality of whole coffee beans 18. As shown therein, the resilient filter 14 is positioned at the bottom of the cup 10, just above the annular groove 26. The filter 14 is circular and sized to be closely received by the circumferential sidewall 22 of the cup body at the bottom thereof. As best shown in FIG. 7, the filter 14 provides a flat surface in the cup body 12 on top of which coffee bean 18 may rest. Importantly, the resilient filter 14 prevents the coffee beans 18 from falling into the annular groove 26 (which is out of reach of a grinding blade) to facilitate optimal grinding by the grinding blade, as discussed in detail hereinafter. As discussed above, the foil cover 16 seals the filter 14 and whole coffee beans 18 inside the cup body 12, keeping the coffee beans 18 fresh until use.

As will be readily appreciated, the prepackaged filter cup 10 is completely sealed on all sides thereof so as to ensure freshness of the coffee beans 18 or other beverage ingredients within the cup 10. In an embodiment, the cup 10 may be vacuum-sealed to further ensure freshness of the beverage ingredients. In another embodiment, he cup 10 may be stored and transported in a separate sealed package or wrapper for additional freshness and protection. In the preferred embodiment, the filter cup 10 is a pre-packaged, single-use, disposable component. Thus, it is sealed by the cover 16 in an air-tight manner to preserve freshness and flavor and to protect the coffee beans 18 from moisture and contamination.

Figure 8:
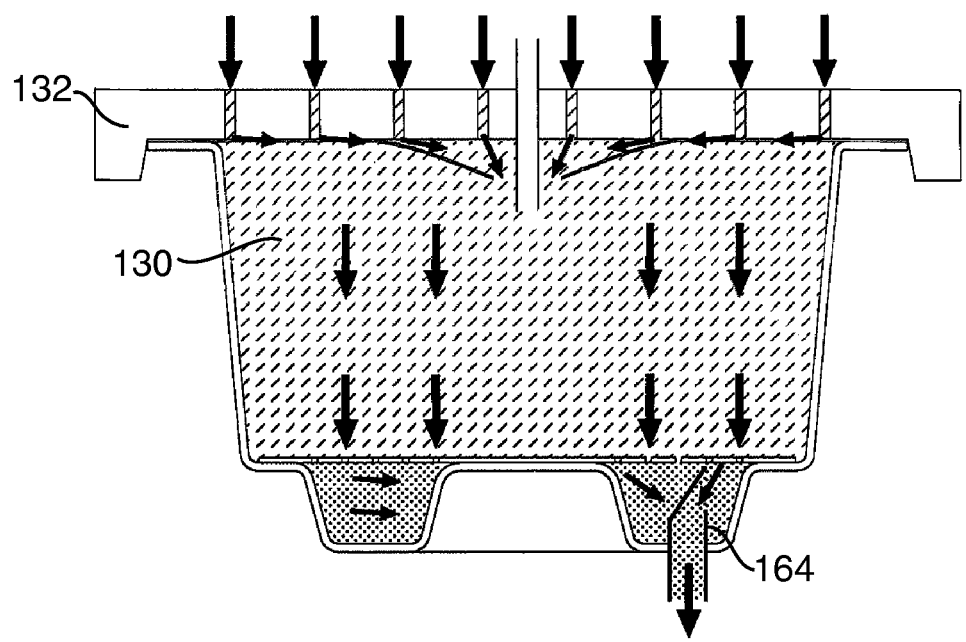
FIG. 8 is a schematic view of the whole coffee bean pre-packaged filter cup of FIG. 1 illustrating a water flow path through the cup during a brewing mode.
Figure 11:
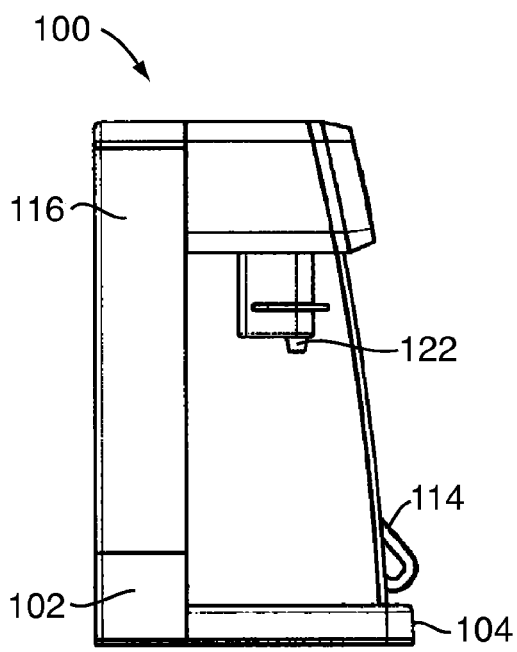
FIG. 11 is a left side elevational view of the brewed beverage appliance of FIG. 9.
Figure 12:
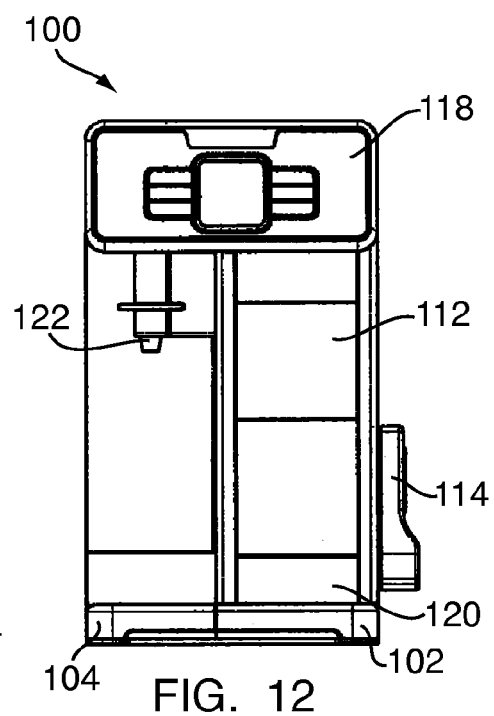
FIG. 12 is a front elevational view of the brewed beverage appliance of FIG. 9.
Figure 13:
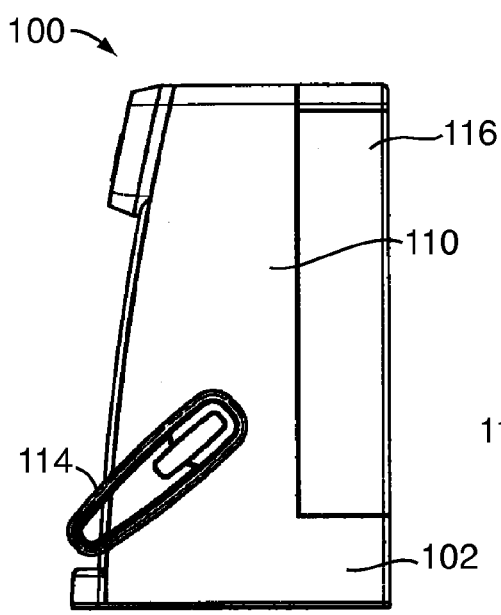
FIG. 13 is a right side elevational view of the brewed beverage appliance of FIG. 9.
Figure 14:
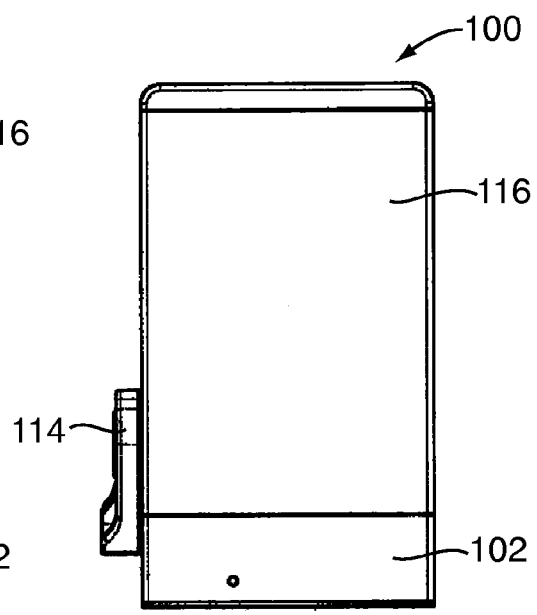
FIG. 14 is a rear elevational view of the brewed beverage appliance of FIG. 9.
Figure 16:
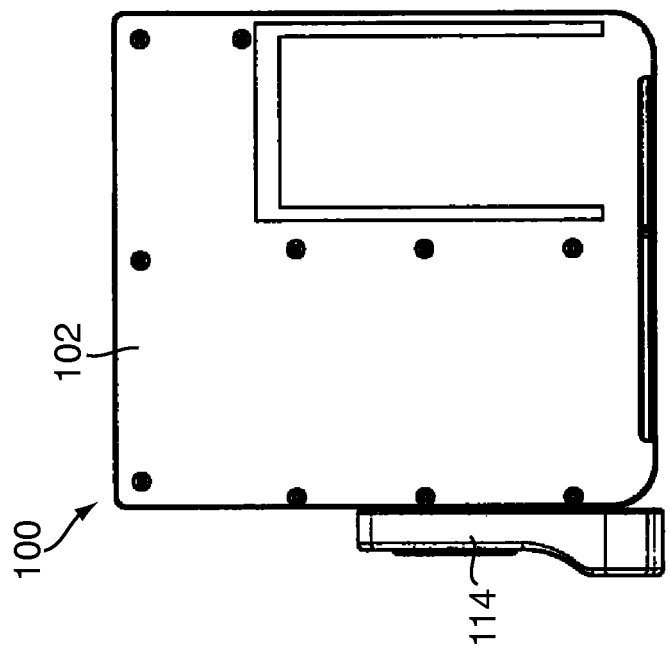
FIG. 16 is a bottom plan view of the brewed beverage appliance of FIG. 9.
Figure 15:
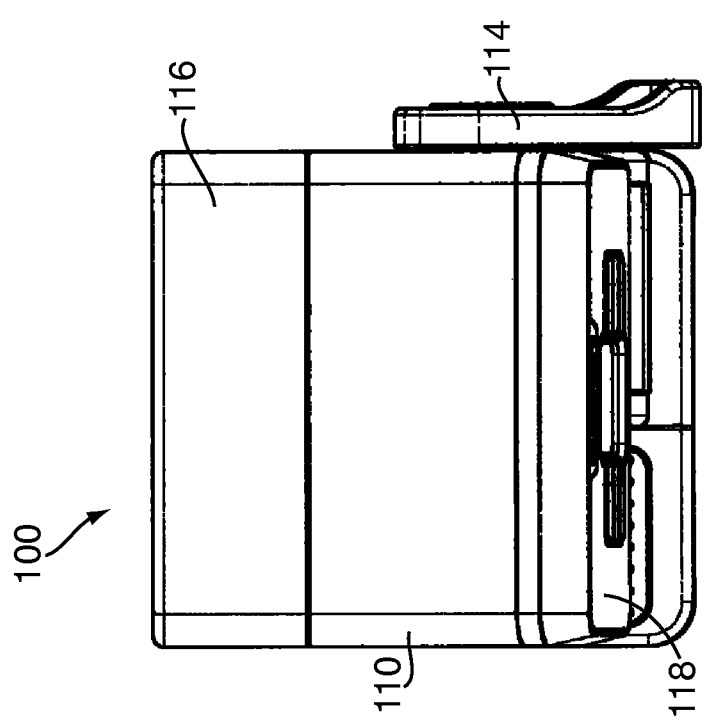
FIG. 15 is a top plan view of the brewed beverage appliance of FIG. 9.

As shown in FIG. 8, and as discussed in detail hereinafter, the floor of the annular groove 26 may be pierced by a needle of a brewed beverage appliance. A blade of the beverage appliance pierces the cover 16 such that water may enter the cup body 12. The water is then passed through the cup 10 to create brewed coffee, which exist the cup through the aperture created by the needle.

Referring to FIGS. 9-25B, a brewed beverage appliance 100 according to an embodiment of the present invention is shown. The appliance 100 is intended to be used in combination with the prepackaged filter cup 10, disclosed above, in order to brew coffee or other beverage. As shown therein, the appliance 100 is generally rectangular in shape and includes a base 102 and a drip tray 104 removably received by the base 102. The drip tray 104 has a slotted or grated top surface 106 that is adapted to support a container, such as a coffee cup. As will be readily appreciated, the grated surface 106 permits liquid that may be spilled from the cup 108 during operation to pass through the surface 106 and collect in the drip tray 104, for easy cleanup.

A housing 110 is located above and is supported by the base 102. In an embodiment, the housing 110 may be integrally formed with the base 102. The housing includes a sliding access door 112 that allows access to a filter cup container holder or loading tray 124 for securing and positioning a prepackaged filter cup 10. A locking handle 114 is pivotally mounted to the housing 110 for operation, as described below. As further shown in FIGS. 9 and 10, a water reservoir 116 is attached to, supported by, and otherwise forms a part of the housing 110. In an embodiment, the water reservoir 116 may be removably or permanently affixed to the housing 110. The housing 110 also includes a control panel 118 for controlling operation of the appliance 100, as discussed hereinafter. As best shown in FIG. 10, the base 102 also includes a drain tray 120 slidably received therein for receiving water from a cleaning operation of the appliance 100.

With further reference to FIGS. 9-25B, the appliance 100 includes a brew spout 122 from which a brewed beverage is dispensed. In an embodiment, the brew spout 122 is adjustable in height, as discussed hereinafter.

Figure 18:
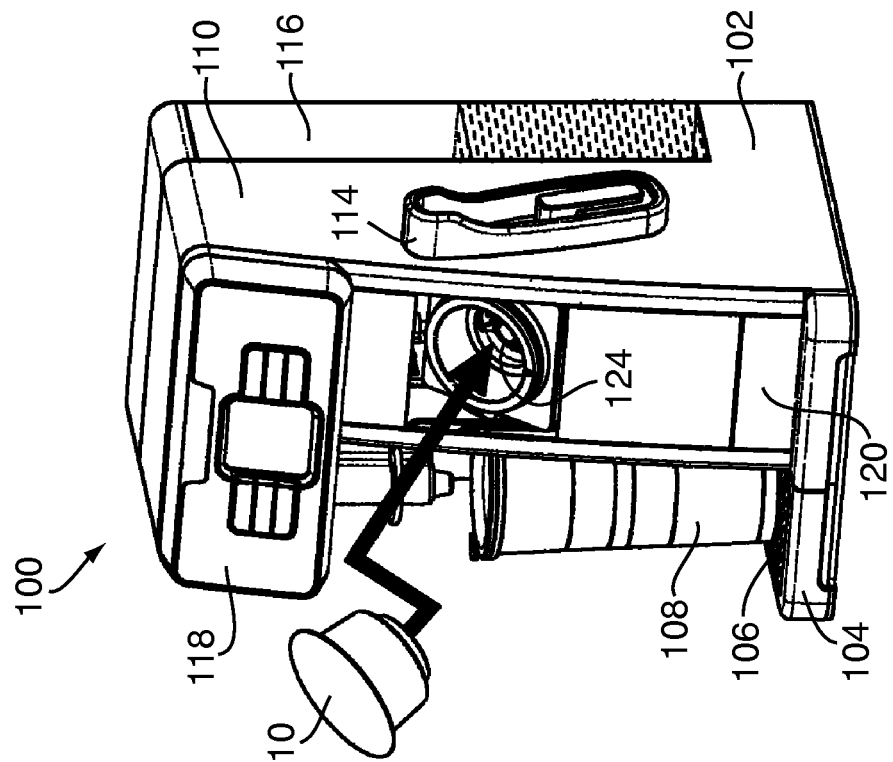
FIG. 18 is a perspective view of the brewed beverage appliance of FIG. 9 illustrating the loading of the whole coffee bean pre-packaged filter cup of FIG. 1.
Figure 17:
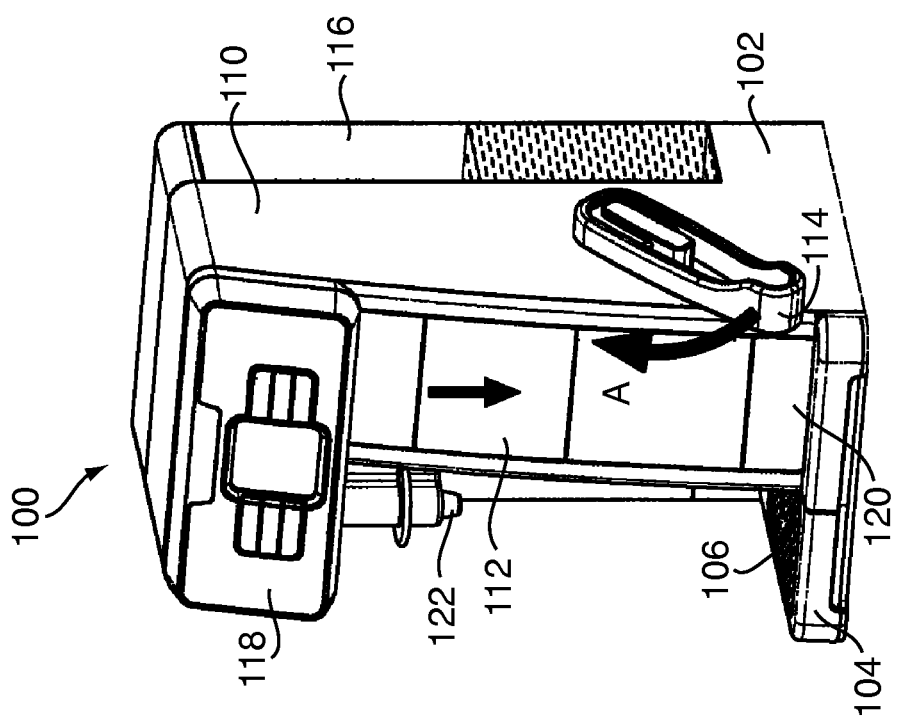
FIG. 17 is a perspective view of the brewed beverage appliance of FIG. 9 illustrating a ready mode thereof.

Operation of the appliance 100 will now be described with specific reference to FIGS. 17-25B. First, the water reservoir 116 is filled with water. A user then selects the desired coffee/beverage settings from the control panel 118. Settings may include selectable options such as coffee strength and serving size, timer setting, automatic brew, etc. The handle 114 is then moved upwardly in the direction of arrow A, as shown in FIG. 17, which causes the sliding access door 112 to move downward in the direction of arrow B to expose the loading tray 124. When the handle 114 is in the "up" position and the sliding access door 112 is retracted, the loading tray 124 is pivoted and angled toward the front of the appliance 100 so as to allow a user to easily insert a prepackaged filter cup 10, as shown in FIG. 18. A user may then place a coffee cup 108 on the drip tray 104, directly beneath the brew spout 122.

Figure 20:
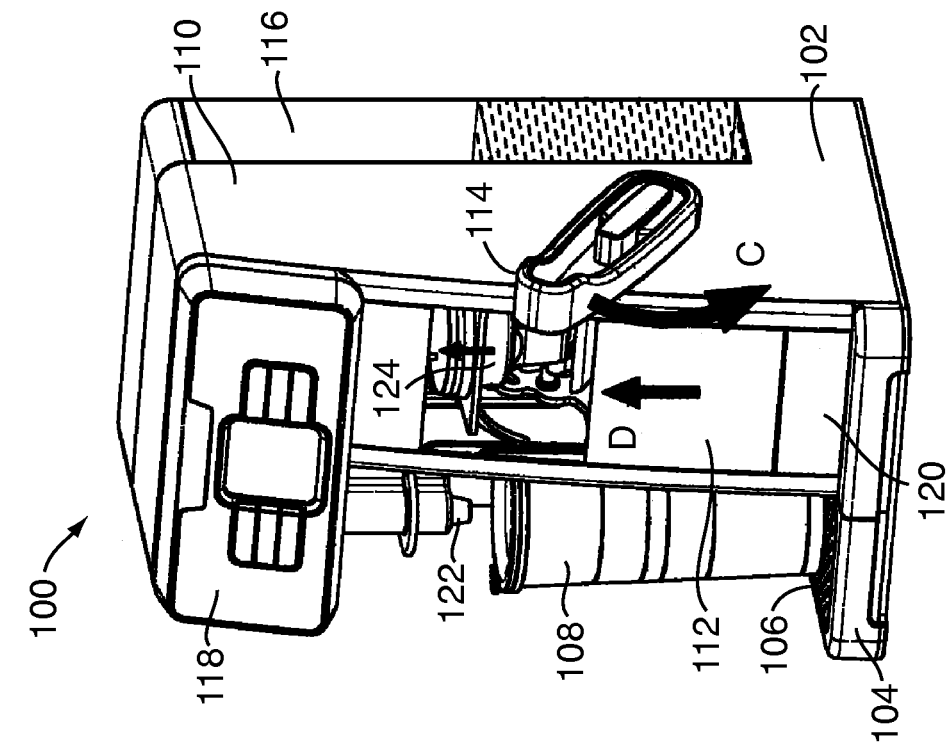
FIG. 20 is a perspective view of the brewed beverage appliance of FIG. 9 illustrating the filter cup being moved to a grinding and brewing position.
Figure 19:
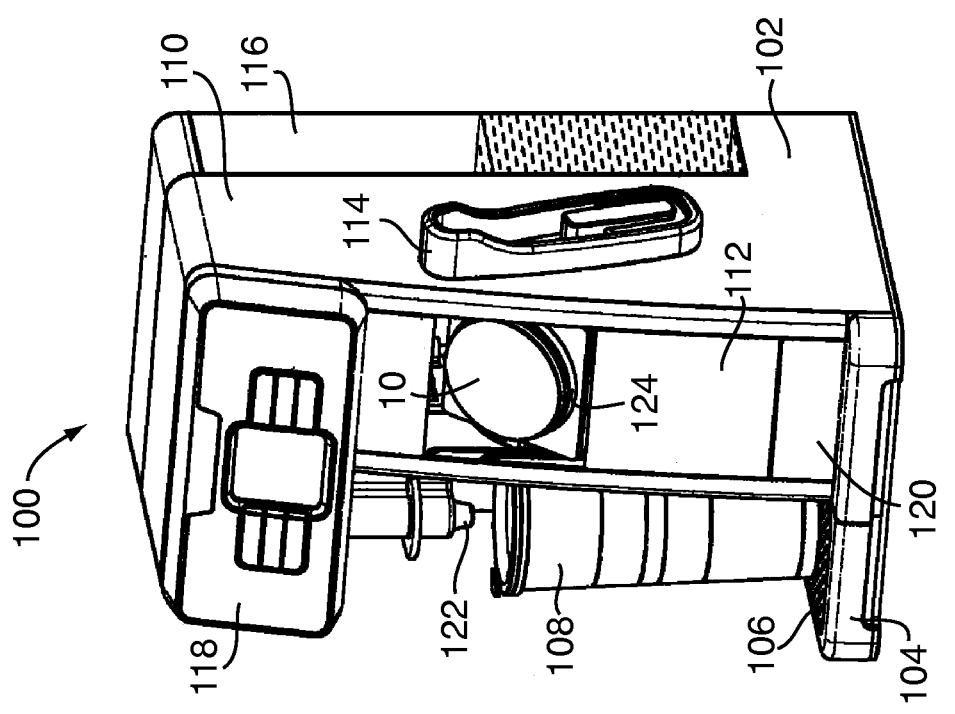
FIG. 19 is a perspective view of the brewed beverage appliance of FIG. 9 illustrating the whole coffee bean pre-packaged filter cup of FIG. 1 in a loading tray.

Once a prepackaged filter cup 10 is positioned in the loading tray 124, as shown in FIG. 19, the locking handle 114 is then moved downward in the direction of arrow C, as shown in FIG. 20. As shown therein, this causes sliding access door 112 to move upwards in the direction of arrow D, to block access to the interior components of the appliance 100, and also moves the filter cup 10 into a grind and brew position, as discussed hereinafter.

A user then selects the desired brew settings using the buttons 126 on the LCD control panel 118, and presses a "BREW" button to initiate the grinding and brewing processes. During the grinding process, the coffee beans 20 in the filter cup 10 are ground by a grinding blade assembly 128 that is received within the cup 10 so that the beans 20 are transformed into coffee grounds 130. After the whole coffee beans 18 within the cup 10 are transformed into coffee grounds 130, the brewing process will automatically commence. During the brewing process, heated water is delivered into the cup 10 from a brew or shower head 132. The heated water passes through the coffee grounds 130, exits through the bottom of the filter cup 10 (see FIG. 8), and is emitted from the brew spout 122 into the coffee mug 108 positioned on the tray 104. The coffee mug 108 may then be removed from the tray 104 and is ready to enjoy.

To remove a used filter cup 10, the locking handle 114 is once again moved into the "up" position, as represented by arrow E in FIG. 23, which causes the loading tray 124 to retract from the grind/brew position and rotate outwardly towards a user, and also causes the access door 112 to open. A user then manually removes the spend filter cup 10 and disposes of the same.

With reference to FIGS. 25A and 25B, once the filter cup 10 is discarded, a user can again move the locking handle 114 to its downward position to close the access door 114. Importantly, the appliance 100 contains control circuitry, which will automatically initiate a cleaning process when the handle is moved to the downward position subsequent to brewing. During the cleaning process, water is dispensed from the brew/shower head 132 to rinse remaining coffee grounds from the grinding blade assembly 128 and the internal brewing area. This water is then collected in the drain tray 120 which can be emptied, as necessary, by sliding it out from the base 102 in the direction of arrow F, as shown in FIG. 25B. In an embodiment, the blade assembly 128 may rotate during application of water to facilitate cleaning. At this point, the appliance 100 is in a standby mode and is ready to brew another beverage.

In yet another embodiment, a cleaning operation may include running a brewing cycle without actually inserting a filter cup 10. In this embodiment, the handle 114 may be moved downward to begin the cycle such that heated water is passed over the blade assembly 128 to clean the same. Alternatively, a button on the control panel 118 may be depressed to initiate the cleaning cycle.

Figure 27:
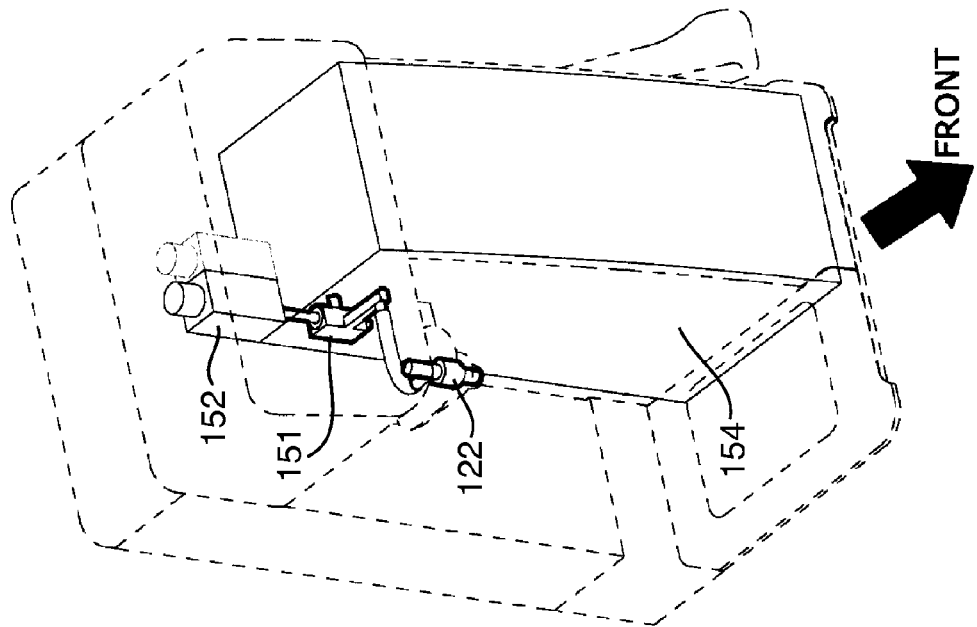
FIG. 27 is a front, left-side perspective view of the brewed beverage appliance of FIG. 9, illustrating the internal components thereof.
Figure 26:
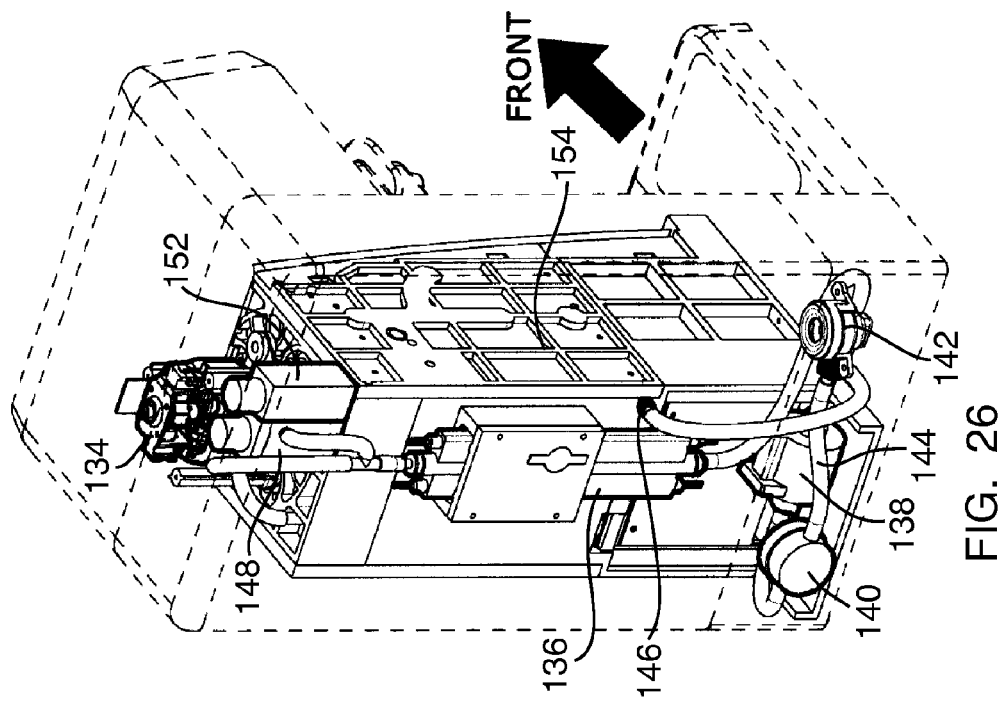
FIG. 26 is rear, left-side perspective view of the brewed beverage appliance of FIG. 9, illustrating the internal components thereof.

FIGS. 26 and 27 illustrate certain internal components of the appliance 100. With reference to FIG. 26, the appliance 100 includes a grinder motor 134 having a rotating output shaft that drives the grinding blade assembly 128. The appliance 100 also includes a heater 136 of the type known in the art that functions to heat water from the water reservoir 116 for use in the brewing process, a pump 138 that draws water from the reservoir 116 via the heater 136 and pumps the water to the shower head 132 for infusion into the filter cup 10, and a flow meter 140 which measures the flow of water from the tank 116. The flow meter 140 may be of the type known in the art and is electrically coupled to the printed circuit board 196 of the control panel 118. In this manner, signals representing the flow rate of water from the tank 116 are relayed to the control panel 118 so that the correct amount of brewed coffee is dispensed from the spout 122 into a user's coffee mug 108.

As further shown in FIG. 26, a water inlet 142 connects to the water tank 116 and provides a passage from the tank 116 to a water conduit 144. A safety valve 146 is provided which functions to release internal pressure when it reaches a predetermined point. A pressure release valve 148 is also provided. As shown in FIGS. 26 and 27, the appliance 100 also includes a three-way valve 151 and solenoid 152. The three-way valve 151 is triggered by the solenoid 152 to control the flow path from the coffee outlet at the loading tray 124 to either the spout 122 or the drain tray 120. FIG. 26 also shows a container loading block 154 which houses the loading tray 124, as discussed hereinafter.

Figure 29:
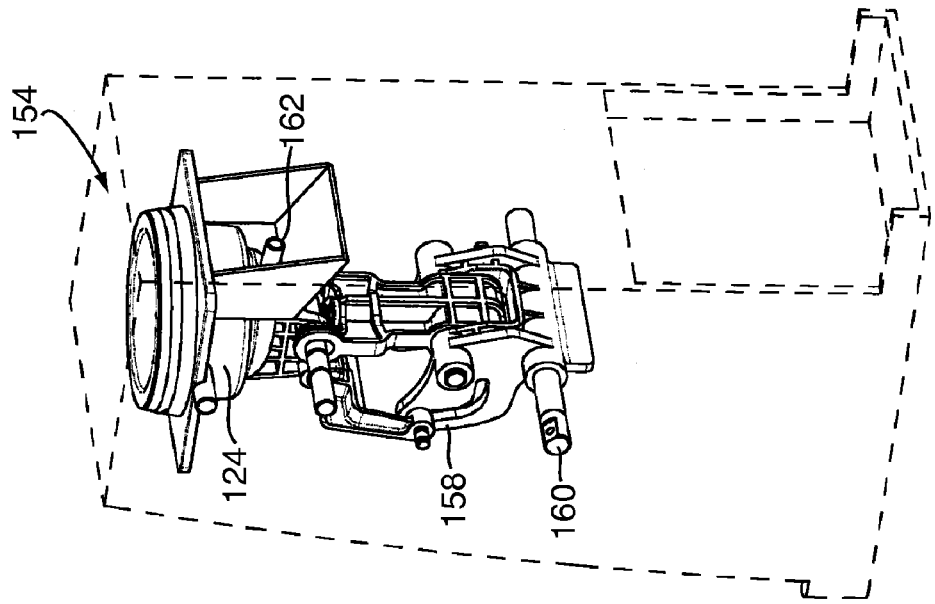
FIG. 29 is a perspective view of the container loading block, shown in phantom, and illustrating the internal components thereof.
Figure 28:
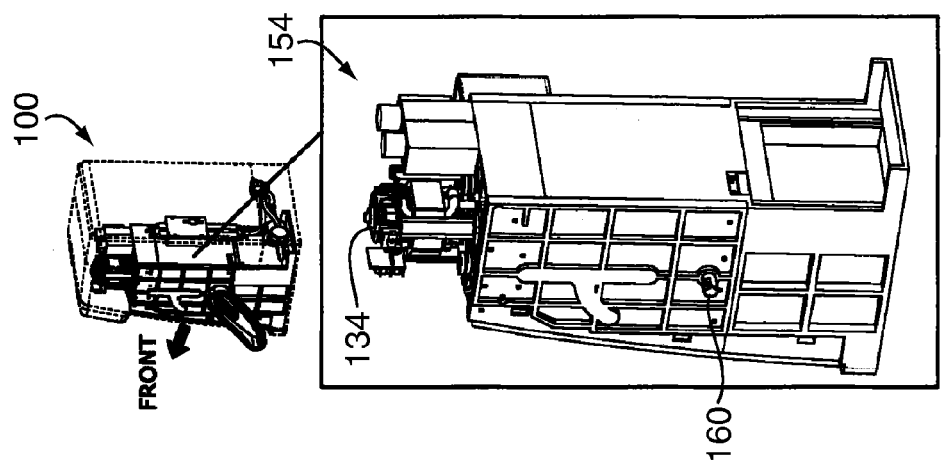
FIG. 28 is an enlarged perspective view of a container loading block of the brewed beverage appliance of FIG. 9.

Turning now to FIGS. 28 and 29, detail views of the container loading block 154 are shown. The container loading block 154 includes the container loading tray 124 defining a generally cylindrical recess adapted to received a prepackaged filter cup 10. A pin or needle (not shown in FIGS. 28 and 29) is provided adjacent the bottom of the cylindrical recess to pierce the bottom of a filter cup 10. A seal ring 156 is configured adjacent the top rim of the cylindrical recess which provides an air-tight and water-tight seal between the loading tray 124 and brew/shower head 132 during brewing, as discussed hereinafter. As best shown in FIG. 29, the container loading block 154 further includes a supporting hinge set 158 which allows for vertical and rotational movement of the loading tray 124, allows the loading tray 124 to be moved into registration with the brew head, and which engages the sliding access door 112 to provide movement thereof upon movement of the handle 114 between its up and down positions. A handle shaft 160 extends outwards from a lower portion of the hinge set 158 and is adapted to receive a complimentary mating portion of the handle 114 in fixed relation. As will be readily appreciated, rotation of the locking handle 114, and thus handle shaft 160, controls movement (upwards, downwards and pivoting movement) of the loading tray 124. A coffee outlet 162 is also provided on the container loading block 154. The coffee outlet 162 is in fluid communication with the pin that pierces the filter cup 10 and directs brewed coffee/water to the three-way valve 151, and ultimately to either the drain tray 120 (during a cleaning/rinsing mode) or to the spout 122 for dispensing (during a brewing mode).

Figure 33:
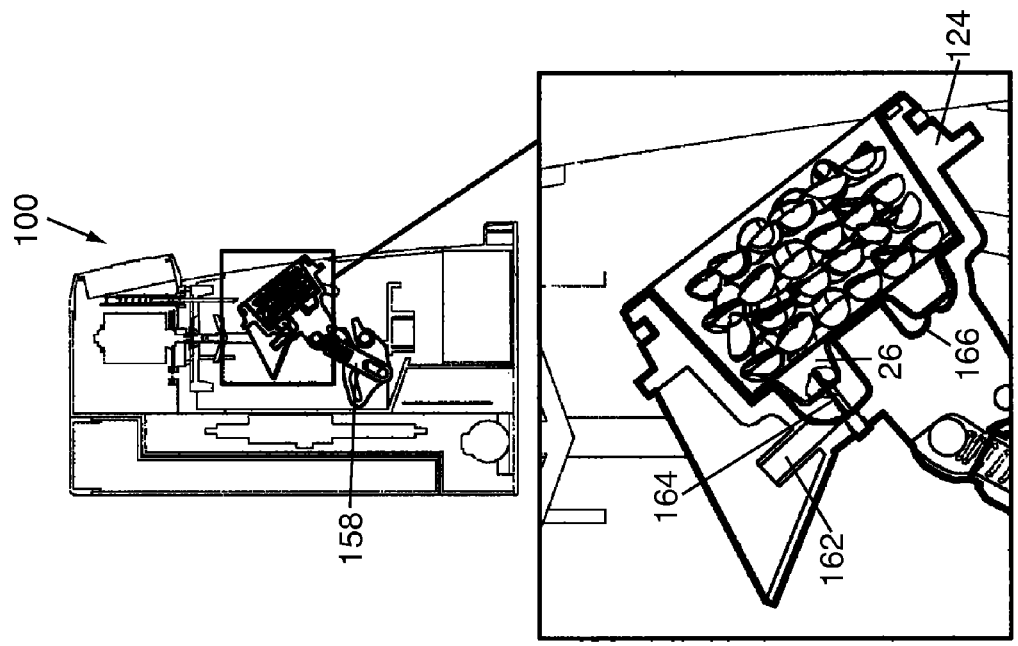
FIG. 33 is an enlarged, cross-sectional view illustrating a piercing mechanism of the container loading block.
Figure 32:
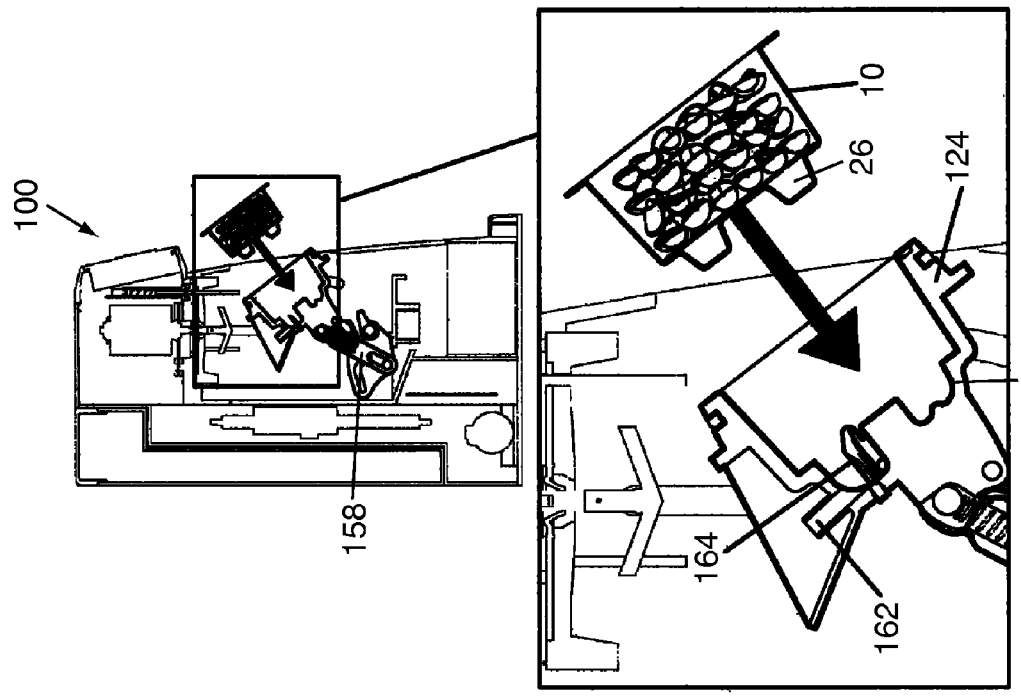
FIG. 32 is an enlarged, cross-sectional view illustrating the loading of a filter cup into a container holder of the container loading block.

Turning now to FIGS. 32 and 33, the piercing mechanism for piercing a hole in the bottom of the filter cup 10 is shown. As best shown in FIG. 32, the piercing mechanism is in the form of a hollow pin 164 or needle built in at the bottom of the loading tray 24. The bottom of the loading tray 124 includes an annular recess 166 dimensioned to receive the annular groove 26 of a filter cup. The hollow interior of the pin 164 is in fluid communication with the coffee outlet 162 so a to provide a flow path from the interior of the filter cup 10 to the spout 122, as discussed hereinafter. As shown in FIGS. 32 and 33, when a filter cup 10 is inserted into the loading tray 124, the pin 164 pierces the floor 24 of the filter cup 10 and enters the annular groove 26. Importantly, the filter cup design, including the annular groove, the loading tray design, including the annular recess 166, and pin length are such that the pin 164 will not pierce the filter cup 10 very deeply in order to avoid piercing the resilient filter 14. During brewing, however, the internal pressure within the filter cup 10 will build up and cause the annular groove 26 of the filter cup to expand downward, causing the pin 164 to reach an optimum piercing depth within the filter cup 10, whereby an aperture in the needle is exposed to the interior of the filter cup 10 so that brewed coffee may flow from the filter cup 10, through the pin 164 and to the coffee outlet 162. As discussed above, the coffee outlet 162 is in fluid communication with the three-way valve 151 so that coffee/liquid can be selectively directed to either the coffee spout 122 (in a brewing mode) or the drain tray 120 (in a cleaning/rinsing mode).

FIGS. 34-36 illustrate a container loading mechanism 168 which is housed within the container loading block 154. The container loading mechanism 168 is comprised of the loading tray 124 and hinge set 158, handle shaft 160 and handle 114. When the locking handle 114 is rotated downwardly, the loading tray 124 rotates inward in the direction of arrow G, as shown in FIG. 34, until the top of the loading tray 124 is in line with the brew/shower head 132, as shown in FIG. 34. Upon further downward rotation of the locking handle 114, the loading tray 124 translates upward, in the direction of arrow H, towards the brew/shower head 132 and the blade assembly 128 until the blade assembly 128 pierces the cover 16 of the filter cup 10. As the handle 114 is moved to its fully downward position, the seal ring 156 is pressed against the underside of the brew/shower head 132, thereby creating an air and liquid tight seal. Brewing may then be commenced.

Figure 38:
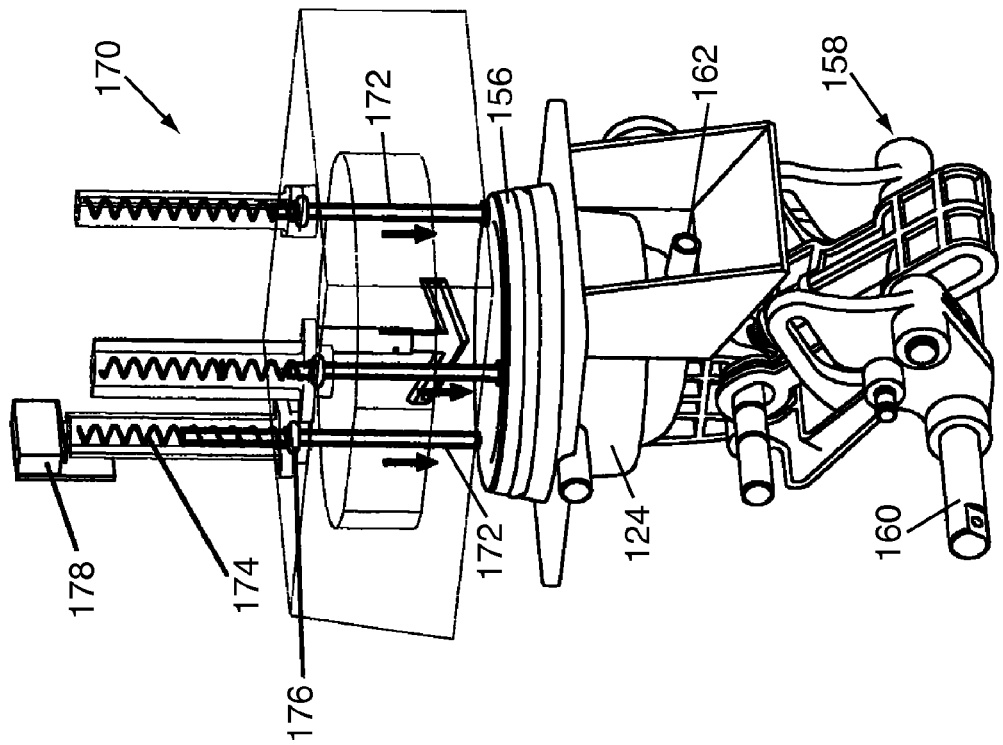
FIG. 38 is another perspective view of the container unloading mechanism.
Figure 37:
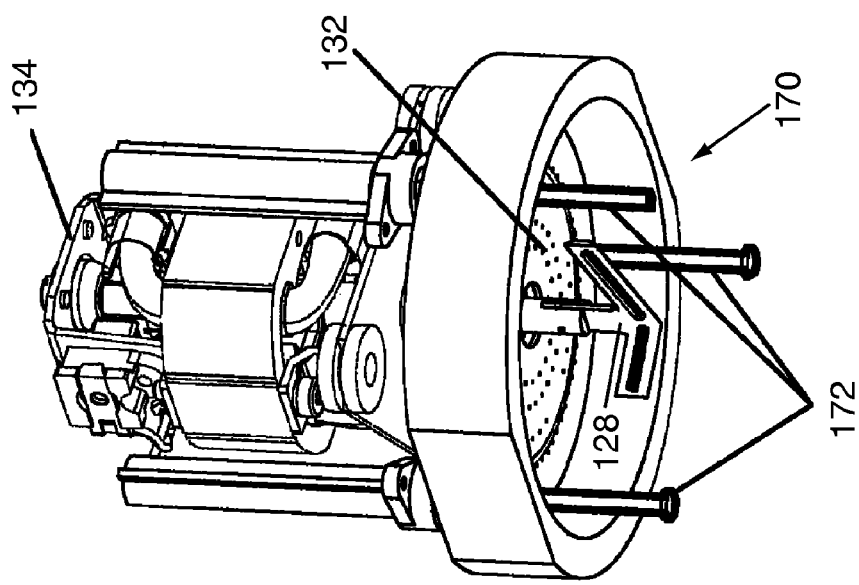
FIG. 37 is a perspective view of a container unloading mechanism of the brewed beverage appliance of FIG. 9.
Figure 41:
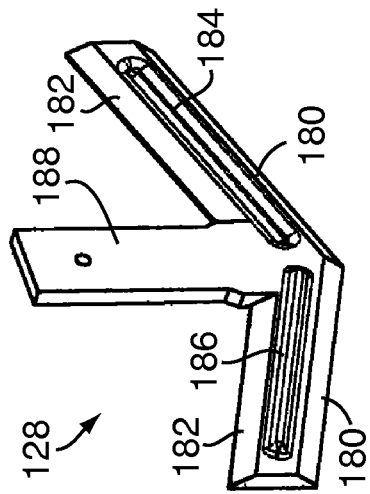
FIG. 41 is a perspective view of a grinding blade assembly for use with the brewed beverage appliance of FIG. 9, in accordance with the present invention.
Figure 46:
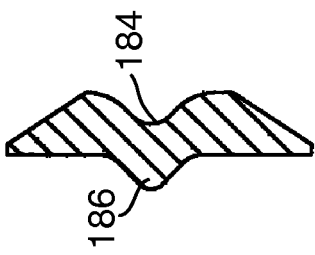
FIG. 46 is a cross-sectional view of grinding blade assembly of FIG. 41, taken along line A-A of FIG. 43.
Figure 45:
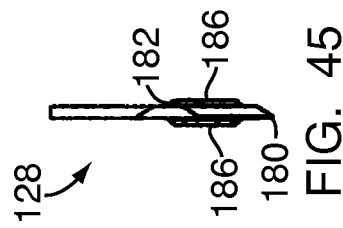
FIG. 45 is a left side elevational view of the grinding blade assembly of FIG. 41.
Figure 42:
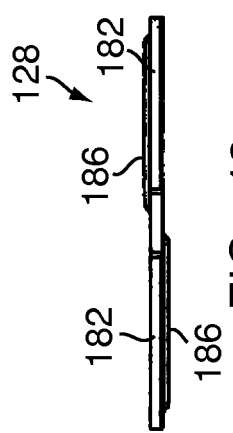
FIG. 42 is a top plan view of the grinding blade assembly of FIG. 41
Figure 43:
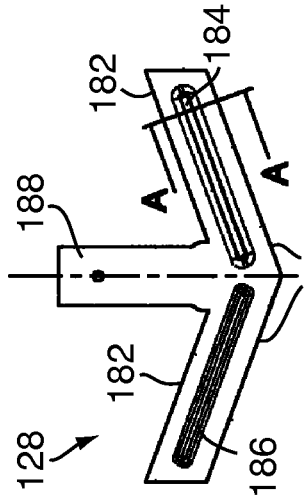
FIG. 43 is a front elevational view of the grinding blade assembly of FIG. 41.
Figure 44:
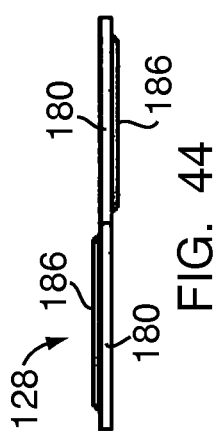
FIG. 44 is a bottom plan view of the grinding blade assembly of FIG. 41.

FIGS. 37 and 38 illustrate a container unloading mechanism 170. As shown therein, the mechanism 170 includes a plurality of push rods 172 that extend through the brew/shower head 132 and are positioned so as to contact the rim of the filter cup 10 (or the seal ring 156 when no filter cup 10 is present) when the loading tray 124 is in the brew position. Each of the push rods 172 is fitted with a coil spring 174, or the like, and a rod seal ring 176. In the preferred embodiment there are three push rods, although less than or more than three may be utilized without departing from the broader aspects of the present invention.

When the loading tray 124 and filter cup 10 are pushed up against the shower head 132 during loading, the filter cup 10 causes the spring biased push rods 172 to retract. In this position, the push rods 172 exert a downward force on the filter cup 10 due to the bias of the coil springs 174. FIG. 39 shows the position of the push rods 172 in the loaded/brew position (before the filter cup 10 is unloaded). Subsequent to brewing, when the handle 114 is moved downward, the loading tray 124 retracts from the shower head 132 and the bias of the push rods 172 pushes against the rim of the used filter cup 10 to ensure that the filter cup 10 retracts from the shower head 132 with the loading tray 124 (without the bias force of the push rods 172, it is possible that the filter cup 10 may stick to the shower head 132). FIG. 40 illustrates the position of the push rods 172 during unloading of the filter cup 10.

In an embodiment, one of the push rods 172 may be configured with a sensor 178 electrically coupled to the PCB 196 of the control panel 118. The sensor 178 is configured to detect whether or not a filter cup 10 is present and to relay feedback signals to the control panel 118 regarding the same. In particular, the sensor 178 is configured to detect a distance of movement of one of the push rods 172 when the loading tray 124 is moved into the brew position. Depending on the distance of movement, the sensor 178 can detect whether or not a filter cup 10 is present. This is then relayed to the PCB 196.

Various views of the grinding blade 128 for grinding the whole coffee beans are shown in FIGS. 41-46. As shown therein, the blade 128 has a V-shaped configuration. Importantly, the blade 128 has insert cutting edges 180 so that the cover 16 of a filter cup 10 can be pierced when the cup 10 is raised into registration with the shower head 132 upon downwards movement of the handle 114. The top of the blade also includes upward facing extract cutting edges 182 for cutting through the cover 16 when the filter cup 10 is lowered away from the blade 128 subsequent to brewing, upon upwards movement of the handle 114. Each leg of the "V" is also formed with an opposed recess 184 and raised ridge 186 to facilitate grinding of the coffee beans 18, as described hereinafter. The blade 128 also includes a flat neck 188 for connection to the output shaft of the grinding motor 134. In such an embodiment, the blade 128 may be removable for replacement and more thorough cleaning. In an alternative embodiment, the blade 128 is integrally formed or otherwise fixedly secured to the output shaft of the motor 134. As will be readily appreciated, the slim profile of the blade 128 puts cuts a slot a minimal width in the cover 16 to prevent coffee grounds 130 from being thrown out of the cup 10 during grinding.

Figure 47:
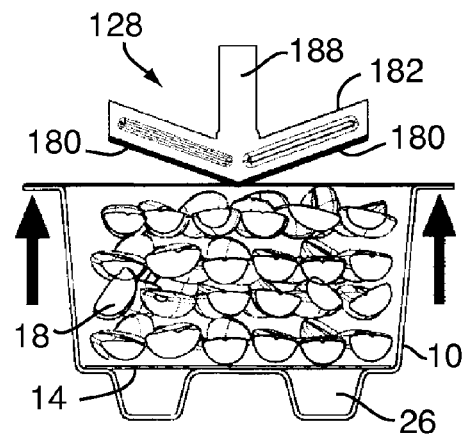
FIG. 47 is a schematic view of a blade assembly and the whole coffee bean pre-packaged filter cup, illustrating insertion of the blade assembly into the cup.
Figure 48:
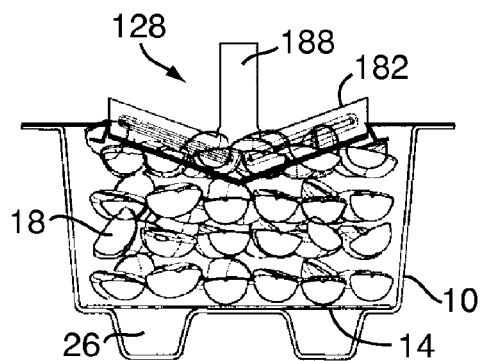
FIG. 48 is another schematic view of a blade assembly and the whole coffee bean pre-packaged filter cup, illustrating the insertion of the blade assembly into the cup.
Figure 49:
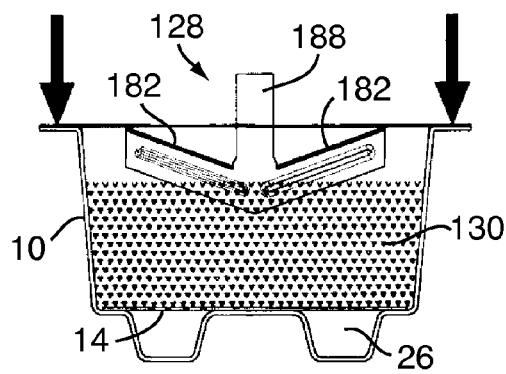
FIG. 49 is a schematic view of a blade assembly and the whole coffee bean pre-packaged filter cup, illustrating retraction of the cup from the blade assembly.
Figure 50:
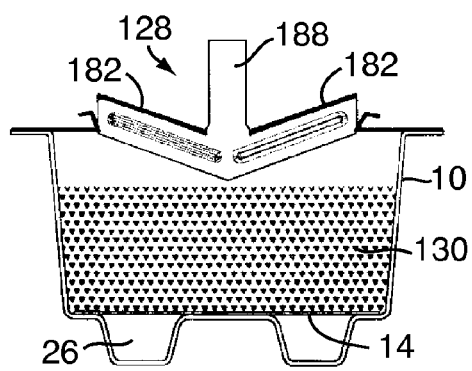
FIG. 50 is another schematic view of a blade assembly and the whole coffee bean pre-packaged filter cup, illustrating the retraction of the cup from the blade assembly.

FIG. 47 is an enlarged, detail view illustrating a filter cup 10 being raised toward the blade 128 and FIG. 48 illustrates the blade 128, by way of the insert cutting edges 180, piercing the cover 16 of the cup 10. In both FIGS. 47 and 48 the coffee beans 18 in the cup 10 are not yet ground. After grinding, the beans 18 have been transformed into ground coffee 130. Brewing occurs, as described above, and the cup 10 is then lowered as shown in FIGS. 49 and 50 such that the extract cutting edges 182 of the blade 128 again pierce the cover 16, if necessary, to facilitate removal of the cup 10 from the blade 128.

Referring now to FIGS. 51-53, the actual grinding process is illustrated. Upon actuation of the grinding motor 134, the grinding blade 128 rotates at a frequency sufficient to grind the whole coffee beans 18 in the filter cup 10 to transform the coffee beans 18 from whole beans, as shown in FIG. 51, into grinds 130, as shown in FIG. 53. In particular, the blade 128 is rotated in a direction (see FIG. 52) that causes the ridge 186 on the blade 166 to strike/impact the coffee beans 18, as shown in FIG. 54, to cause them to split. Over time, numerous impacts from the blade itself, and most importantly, by the ridges 186, as shown in FIG. 54, gradually reduce the size of the coffee beans to fine grounds sufficient for brewing.

In an embodiment, the blade 128 may continue to rotate at a predetermined frequency during the brewing process, i.e., during the time during which hot water is passed through the cup 10. The frequency of rotation during brewing may be the same as, or different from, the frequency utilized to grind the coffee beans 18. In other embodiments, the blade 128 may be utilized to stir drink ingredients during brewing, such as to facilitate dissolution of drink ingredients into the water passing through the cup 10 (e.g., when utilizing iced tea drink ingredients in place of whole coffee beans). As will be readily appreciated, stirring the drink ingredients/coffee beans within the cup 10 while brewing may produce a better tasting beverage. In particular, stirring during brewing may improve the contact between the coffee grounds 130 and the hot water, which may improve coffee quality and/or concentration.

Figure 55:
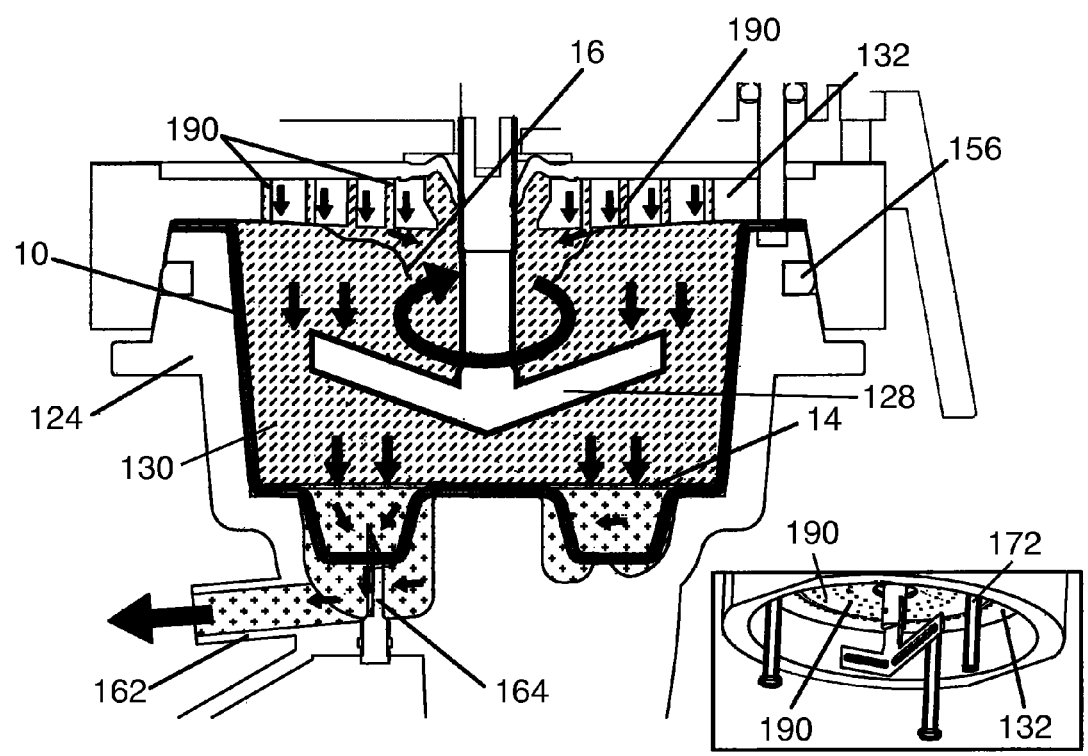
FIG. 55 is an enlarged cross-sectional view of a brewing mechanism of the brewed beverage appliance of FIG. 9.

Turning now to FIG. 55, operation of the brewing mechanism is illustrated. As shown therein, water from the water tank 116 is heated by the heater 136 and pumped by the pump 138 to the shower/brew head 132. The brew head 132 includes a plurality of small apertures 190 through which the heated water passes before entering the filter cup 10 through the hole created by the grinding blade 128. Notably, the numerous apertures 190 deliver water evenly to the top of the filter cup 10, which helps to minimize the amount of coffee grounds 130 at the brew head and keeps the cover 16 clean after the brewing process. The heated water fills up the filter cup 10. When the filter cup 10 is full with heated water, pressure is built up within the container (as a the filter 14 limits flow). As a result, pressurized brewing occurs within the filter cup 10.

In an embodiment, as discussed above, the blade 128 may rotate during brewing to facilitate contact between the heated water and the coffee grounds 130, thereby improving coffee qualify. The brewed coffee then passes through the filter 14 into the annular groove 26 of the cup 10, and through the hollow needle 164 to the coffee outlet 162. From the coffee outlet 162, the brewed coffee passes through the three-way valve 151 and to the coffee spout 122 for dispensing into a coffee cup 108.

In an embodiment, near the end of the brewing cycle, the pump 138 will stop first so that the heater 136 further heats up the water to produce stem. This steam travels through the system to push the remaining coffee out of the filter cup 10. As will be readily appreciated, this stem burst removes excess water from the coffee grounds 130 within the filter cup 10, thereby ensuring an easy and mess-free disposal and cleanup.

Figure 58:
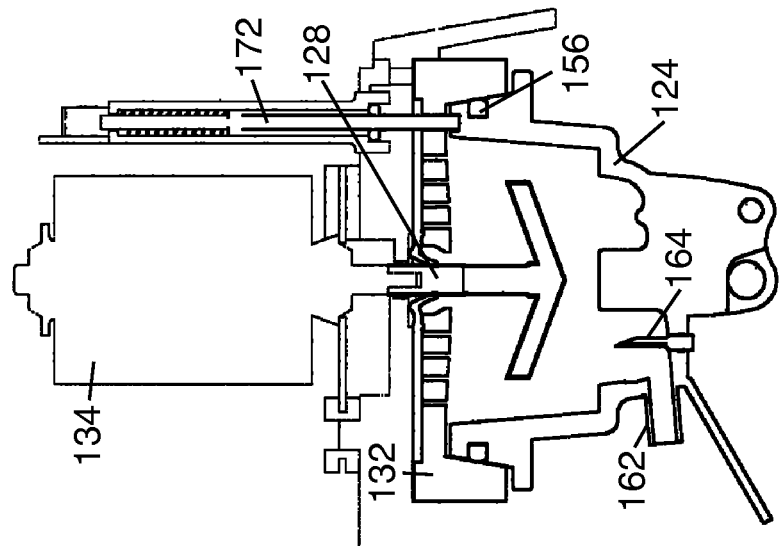
FIG. 58 is a schematic drawing of the auto-rinse mechanism of the brewed beverage appliance of FIG. 9, illustrating the blade assembly after rinsing.
Figure 57:
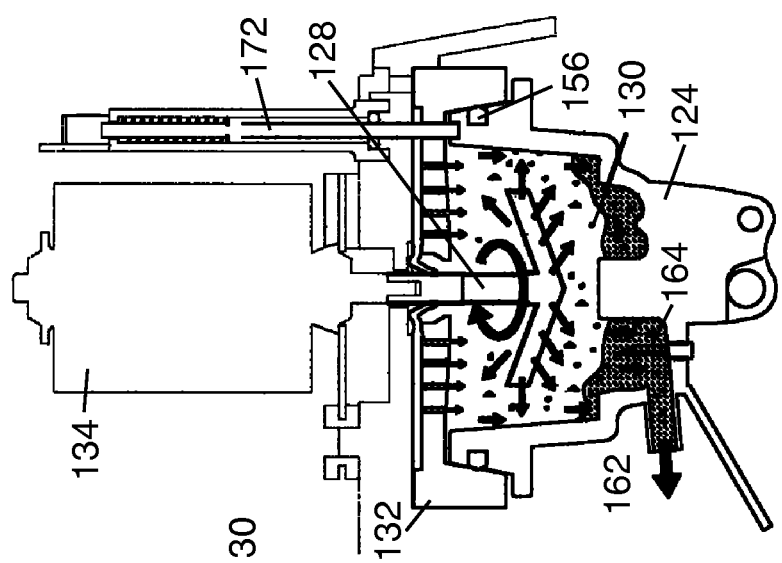
FIG. 57 is a schematic drawing of the auto-rinse mechanism of the brewed beverage appliance of FIG. 9, illustrating the rinsing process.
Figure 56:
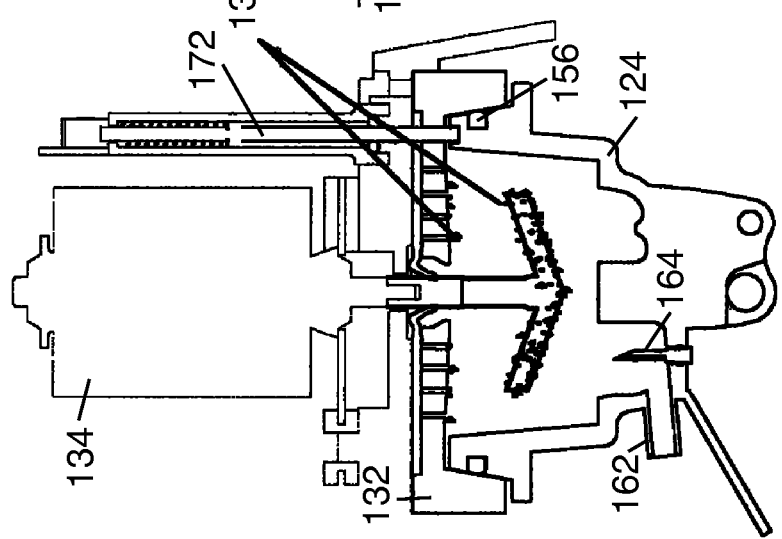
FIG. 56 is a schematic drawing of an auto-rinse mechanism of the brewed beverage appliance of FIG. 9, illustrating the blade assembly before rinsing.

FIGS. 56-58 illustrate an auto-rinsing mechanism which is automatically initiated once brewing is completed. Once a filter cup 10 is removed by the user after the brewing process, coffee grounds 130 may remain on the grinding blade 128 or the brew head 132, as shown in FIG. 56. When a user pulls down on the locking handle 114 after removing the spent filter cup 10, the sliding door 112 is closed, blocking access to the brew head 132 and loading tray 124. The control circuitry of the control panel 118 will then initiate the rinsing process. During rinsing, water will be pumped from the reservoir 116 by the pump 138 and heated by the heater 136. The hot water will then exit through the shower/brew head 132 to rinse/cleanse the brew head 132 and blade assembly 128 of remaining coffee grounds 130. In an embodiment, the blade 128 will rotate during rinsing to facilitate the removal of coffee grounds 130 from the blade, as shown in FIG. 57. Steam will then be generated in the manner described above and delivered to the loading tray 124 to flush the remaining rinsing water from the loading tray 124 and to the coffee outlet 162. During, or immediately prior to the rinsing process, the solenoid 152 controls the three-way valve 151 so that the rinsing water and coffee grounds 130 carried therein are directed to the drain tray 120 instead of the spout 122. At this point, the loading tray 124, blade 128 and brew head 132 are free from coffee grounds 130 and the appliance is ready for another brewing cycle, as shown in FIG. 58. A notification on the control panel 118 may remind a user to empty the drain tray 120 after a pre-determined number of brewing cycles.

Figure 59:
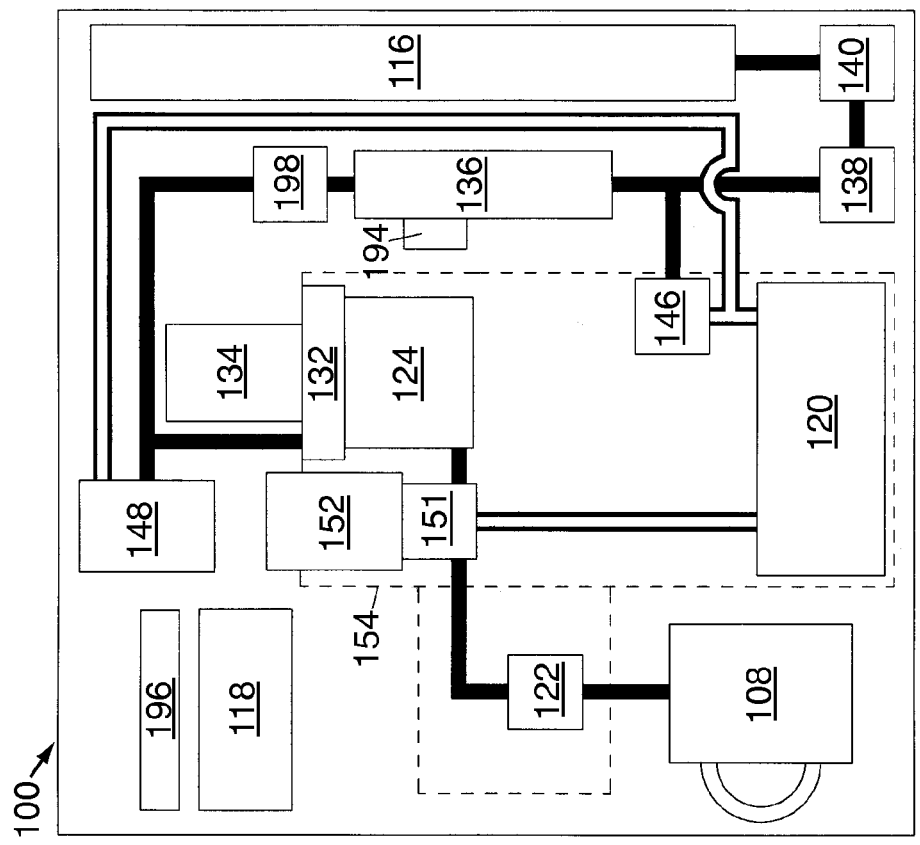
FIG. 59 is a schematic view of the brewed beverage appliance of FIG. 9, in a grinding mode.

With reference to FIG. 59, the grinding stage of the appliance 100 is illustrated in block form. As shown therein, and as discussed above, during the grinding stage the grinder motor 134 will rotate at a high enough frequency to grind the whole coffee beans 18 within the filter cup 10. At the same time, the heater will pre-heat the water from the reservoir 116. As shown in FIG. 59, the heater may include a sensor 194 that controls the heater 136 so that a suitable temperature (or temperature range) for brewing is obtained. The heater sensor 194 is electrically coupled to the PCB 196 of the control panel 118 such that the PCB 196 may control the temperature of the heater 136 through the heater sensor 194.

Figure 60:
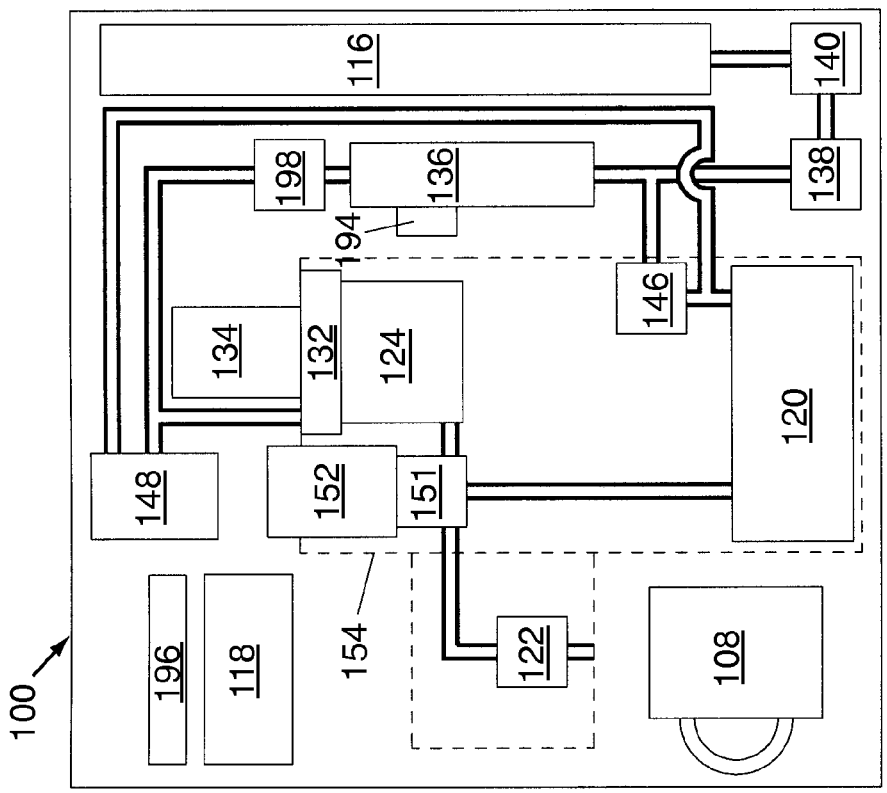
FIG. 60 is a schematic view of the brewed beverage appliance of FIG. 9, in a brewing mode.

With reference to FIG. 60, the brewing stage of the appliance is illustrated in block form. As shown therein, and as discussed above, the solenoid controls (or is deactivated) the three-way valve 151 such that the flow path is to the coffee spout 122. A small amount of water is heated by the heater 136 and pumped into the filter cup 10 to pre-wet the coffee grounds 130. Normal brewing is then commenced wherein water is continuously pumped through the heater 136 and into the filter cup 10. Importantly, the water temperature is regulated throughout the brewing process for optimum brewing and taste. In connection with this, a water temperature sensor 198 detects a temperature of the water exiting the heater 136 and relays this temperature to the PCB 196 of the control panel 118. The heater power and pump rate may then be adjusted to keep the water temperature within the optimal range. The flow meter 140 also keeps track of the flow rate and relays this information to the PCB 196. Towards the end of the brewing process, the pump 138 will stop first to let the heater 136 further heat the water to produce steam, as discussed above. This steam then travels through the system to push the remaining coffee out of the filter cup 10. After all coffee exits the filter cup 10, the pressure release valve 148 is opened (in response to a signal from the PCB 196 of the control panel 118) to release the pressure inside the filter cup 10. Residual steam or water will then be delivered to the drain tray 120. In the event that the brewing channel is blocked during the brewing process, the safety valve 146 is configured to release pressure to the drain tray 120.

Figure 61:
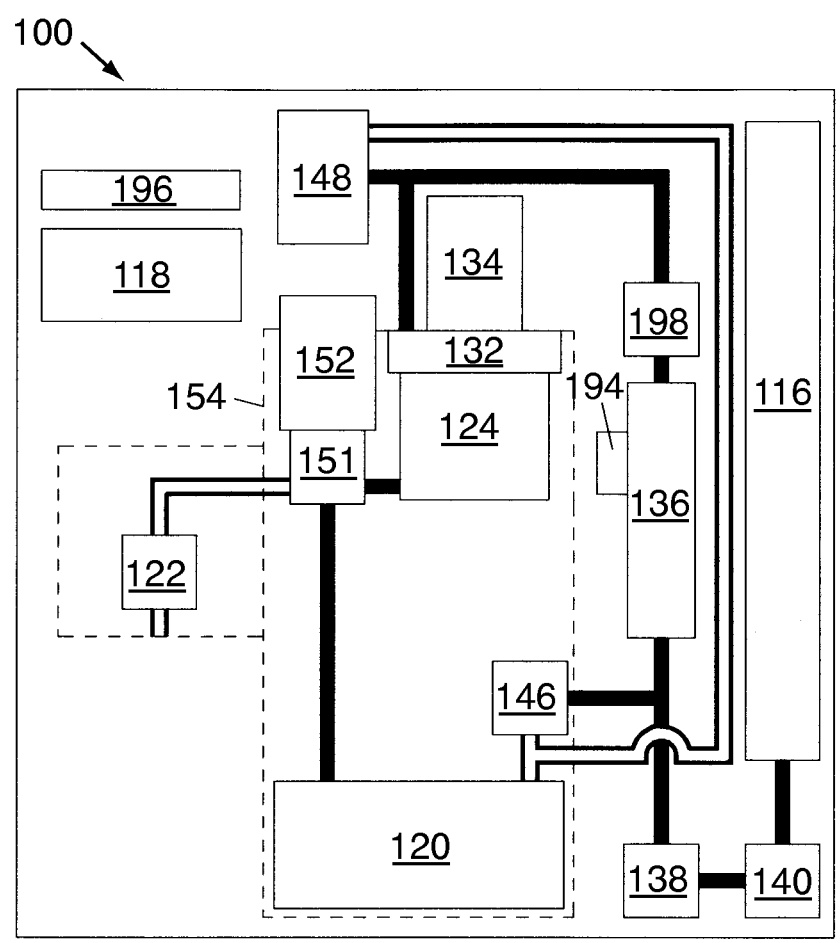
FIG. 61 is a schematic view of the brewed beverage appliance of FIG. 9, in a rinsing mode.

Finally, with reference to FIG. 61, the brewing stage of the appliance 100 is illustrated in block form. As shown therein, and as discussed above, after a user removed the used filer cup 10 and pulls down the locking handle 114, the loading tray 124 is moved into registration with the shower head 132. The PCB 196 checks if the filter cup 10 is removed or is still present (through the push rods 172 and sensor 178). If no filter cup 10 is detected, the rinsing process is automatically initiated. In particular, the solenoid 152 controls the three-way valve 151 so that the flow path is to the drain tray 120. A small amount of hot water is pumped into the loading tray 124 and the grinding blade 128 is rotated by the grinder motor 134 to remove any remaining coffee grounds 130. Towards the end of the rinsing process, the pump 138 will stop first to let the heater 136 further heat the water to produce steam, as discussed above. This steam then travels through the system to flush all the rinsing water and coffee grounds 130 from the filter cup 10 to the drain tray 120.

Figure 62:
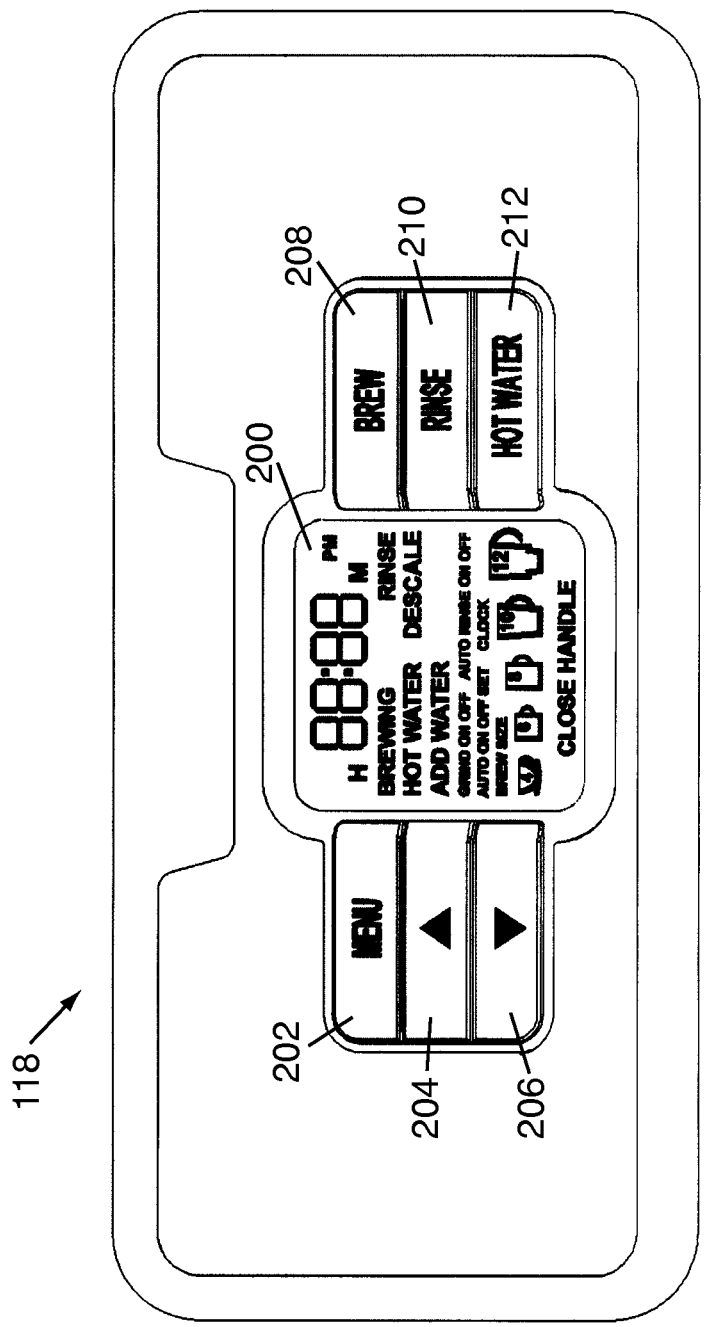
FIG. 62 is a plan view of a control panel of the brewed beverage appliance of FIG. 9.

Turning now to FIG. 62, a detail view of the control panel 118 is shown. As shown therein, the control panel 118 includes a LCD display 200, a "MENU" button 202 that allows for function selection and switching between functions by a user, up/down arrows 204, 206 for adjusting each function, and a "BREW" button 208 which initiates the grinding and brewing process. In the preferred embodiment, the control panel 118 further includes a "RINSE" button 210 for manually initiating the rinsing process (in alternative to the automatic rinsing described above) and a "HOT WATER" button 212 for dispensing hot water only. In the preferred embodiment, major menu functions include grind on/off, auto rinse on/off, auto on settings, auto off settings, default brew size selection and a clock. Each of these functions may be displayed on the LCD display 200.

While the preferred embodiment contemplates the grinding and brewing of coffee from whole coffee beans, the present invention is not intended to be limited in this regard. In particular, it is contemplated that the present invention apparatus and method are not limited to cups containing whole bean coffee, per se, and the invention may be used with cups containing ground coffee, partially ground coffee, tea leaves, ground tea, or drink mix ingredients. In addition, the appliance according to the embodiments of the present invention can make/brew beverages from any ingredients contained within the filter cup, and is not limited to brewing coffee from whole coffee beans.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A beverage appliance, comprising:
a housing, said housing including a liquid reservoir supported by said housing;
a receptacle in said housing dimensioned to receive a container containing at least one drink ingredient having particles of a first size, said receptacle being pivotable from a first position in which said receptacle is angled towards a front of said appliance and a second position in which said receptacle is aligned with a brew head and contacts said brew head, said receptacle including a generally hollow needle arranged at the bottom thereof for piercing a bottom of said container, said hollow needle being in fluid communication with a beverage outlet;
a mechanism for transforming said particles of said drink ingredient from said first size to a second size within said container, said second size being smaller than said first size;
a three way valve in fluid communication with said beverage outlet;
a solenoid for controlling said three way valve to direct a flow of beverage to one of a beverage spout and a drain tray; and
a container unloading mechanism including a plurality of spring biased push rods, said push rods being aligned with a rim of said container and exerting a downward force on an upper surface of said rim when said receptacle is in said second position such that said downward forces urges said container away from said brew head, and a sensor configured to detect a distance of vertical travel of at least one of said push rods.

2. The beverage appliance of claim 1, wherein:
said drink ingredient is whole coffee beans.

3. The beverage appliance of claim 1, further comprising:
a handle, said handle being pivotable between a first position and a second position to move said receptacle from said first position to said second position.

4. The beverage appliance of claim 1, wherein:
said brew head includes a plurality of apertures in fluid communication with said liquid reservoir and positioned to direct a flow of liquid to said container within said receptacle.

5. The beverage appliance of claim 1, wherein:
said receptacle includes a seal ring adjacent a top rim of said receptacle, said seal ring being configured for sealingly contacting said brew head to create a substantially air-tight seal.

6. The beverage appliance of claim 1, wherein:
said mechanism is a grinding blade rotatably driven by a motor.

7. The beverage appliance of claim 6, wherein:
said grinding blade is substantially V-shaped and includes a bottom sharpened edge, a top sharpened edge and at least one protrusion on a side thereof, said at least one protrusion impacting said particles upon rotation of said grinding blade.

8. The beverage appliance of claim 3, further comprising:
a sliding access door, said sliding access door being movable between an open state in which said receptacle is accessible, and a closed state in which access to said receptacle is prevented, when said handle is moved from said first position to said second position.

9. The beverage appliance of claim 1, further comprising;
a pump for receiving liquid from said liquid reservoir and directing it to said container; and
a heater for heating said liquid.

10. The beverage appliance of claim 1, further comprising:
a control panel for controlling at least one operation of said beverage appliance.

11. A beverage brewing system, comprising:
a housing, said housing including a liquid reservoir supported by said housing;
a receptacle in said housing dimensioned to receive a container containing at least one drink ingredient having particles of a first size;
a mechanism for transforming said particles of said drink ingredient from said first size to a second size within said container, said second size being smaller than said first size;
a pump in fluid communication with said liquid reservoir for pumping liquid from said liquid reservoir to said container within said receptacle;
a heater in fluid communication with said liquid reservoir for heating said liquid;
a control unit electrically coupled to said pump and said heater for controlling said pump and said heater;
a brew head having a plurality of apertures in fluid communication with an outlet of said heater, said brew head being positioned so as to direct a flow of water to said receptacle; and
a container unloading mechanism including a plurality of spring biased push rods, said push rods being aligned with a rim of said container and exerting a downward force on an upper surface of said rim when said receptacle is aligned with said brew head such that said downward forces urges said container away from said brew head, and a sensor electrically coupled to said control unit and configured to detect a distance of vertical travel of at least one of said push rods.

12. The beverage brewing system of claim 11, further comprising:
a flow meter in fluid communication with said liquid reservoir for monitoring a flow rate of said liquid from said reservoir, said flow meter being electrically coupled to said control unit for relay signals indicative of said flow rate to said control unit.

13. The beverage brewing system of claim 11, further comprising:
a temperature sensor in fluid communication with an outlet of said heater and electrically coupled to said control unit.

14. The beverage brewing system of claim 11, further comprising:
a three way valve in fluid communication with an outlet of said receptacle, said three way valve being selectively controllable by a solenoid to direct said liquid from said outlet to one of a spout or a drain tray.

15. The beverage brewing system of claim 11, further comprising:
a pressure release valve selectively controllable to release pressure within said container.

16. The beverage brewing system of claim 11, wherein:
said receptacle is pivotable from a first position in which said receptacle is angled towards a front of said appliance and a second position in which said receptacle is aligned with said brew head and contacts said brew head.

17. The beverage brewing system of claim 11, wherein:
said drink ingredient is whole coffee beans.

* * * * *